United States Patent
Baek et al.

(10) Patent No.: US 10,863,412 B2
(45) Date of Patent: Dec. 8, 2020

(54) METHOD AND APPARATUS FOR REGISTRATION TYPE ADDITION FOR SERVICE NEGOTIATION

(71) Applicant: Samsung Electronics Co., Ltd., Gyeonggi-do (KR)

(72) Inventors: Youngkyo Baek, Seoul (KR); Jungje Son, Gyeonggi-do (KR); Hoyeon Lee, Seoul (KR); Sunghoon Kim, Seoul (KR)

(73) Assignee: Samsung Electronics Co., Ltd

( * ) Notice: Subject to any disclaimer, the term of this patent is extended or adjusted under 35 U.S.C. 154(b) by 93 days.

(21) Appl. No.: 15/965,166

(22) Filed: Apr. 27, 2018

(65) Prior Publication Data

US 2018/0317157 A1 Nov. 1, 2018

(30) Foreign Application Priority Data

Apr. 27, 2017 (KR) .................. 10-2017-0054432
Sep. 8, 2017 (KR) .................. 10-2017-0114984

(51) Int. Cl.
*H04W 40/20* (2009.01)
*H04W 48/18* (2009.01)
(Continued)

(52) U.S. Cl.
CPC ............ *H04W 40/20* (2013.01); *H04W 8/02* (2013.01); *H04W 28/16* (2013.01); *H04W 48/18* (2013.01);
(Continued)

(58) Field of Classification Search
None
See application file for complete search history.

(56) References Cited

U.S. PATENT DOCUMENTS

2011/0182235 A1  7/2011 Shaheen et al.
2011/0202635 A1* 8/2011 Yeung ................. H04L 12/1407
                                                  709/219
(Continued)

FOREIGN PATENT DOCUMENTS

WO    WO 2016/202363    12/2016

OTHER PUBLICATIONS

3GPP, 3rd Generation Partnership Project; Technical Specification Group Services and System Aspects; Study on Architecture for Next Generation System, (Release 14), 3GPP TR 23.799, V14.0.0, Dec. 2016, 520 pages.
(Continued)

*Primary Examiner* — Adnan Baig
(74) *Attorney, Agent, or Firm* — The Farrell Law Firm, P.C.

(57) ABSTRACT

An apparatus and method are provided for steering a protocol data unit (PDU) session associated with traffic routed to a selected user plane function (UPF). The method includes receiving, from an application function (AF), a first message including information identifying a UPF toward which traffic routing is applied and information on a spatial condition of a terminal location; receiving, from a session management function (SMF) device, a second message including information on a change of the terminal location in an area of interest determined based on the spatial condition; selecting a UPF based on the information identifying the UPF and the information on the change of the terminal location; and transmitting, to the SMF device, a third message including information on the selected UPF for steering a PDU session associated with traffic routed to the selected UPF.

20 Claims, 18 Drawing Sheets

(51) Int. Cl.
   *H04W 8/02* (2009.01)
   *H04W 28/16* (2009.01)
   *H04W 76/11* (2018.01)
   *H04W 4/02* (2018.01)
   *H04W 60/00* (2009.01)
   *H04W 40/36* (2009.01)
   *H04W 8/06* (2009.01)
   *H04W 8/18* (2009.01)

(52) U.S. Cl.
   CPC .............. *H04W 76/11* (2018.02); *H04W 4/02* (2013.01); *H04W 8/06* (2013.01); *H04W 8/18* (2013.01); *H04W 40/36* (2013.01); *H04W 60/00* (2013.01)

(56) References Cited

U.S. PATENT DOCUMENTS

| | | | |
|---|---|---|---|
| 2017/0099612 A1 | 4/2017 | Salot et al. | |
| 2017/0150420 A1 | 5/2017 | Olsson et al. | |
| 2017/0289270 A1* | 10/2017 | Li | H04L 41/12 |
| 2018/0192390 A1* | 7/2018 | Li | H04W 8/065 |
| 2019/0159107 A1* | 5/2019 | Kim | H04W 12/06 |
| 2019/0223060 A1* | 7/2019 | Zhou | H04W 36/0022 |

OTHER PUBLICATIONS

Junseok Kim et al., "3GPP SA2 Architecture and Functions for 5G Mobile Communication System", ICT Express vol. 3, Issue 1, Apr. 13, 2017, 8 pages.

International Search Report dated Aug. 7, 2018 issued in counterpart application No. PCT/KR2018/004854, 7 pages.

Ericsson, "23.502: Call Flows for Application Influence on Traffic Routing", S1-1701754, SA WG2 Meeting #120, Mar. 27-31, 2017, 3 pages.

3GPP, 3rd Generation Partnership Project; Technical Specification Group Services and System Aspects; System Architecture for the 5G System; Stage 2 (Release 15), 3GPP TS 23.501 V0.4.0, Apr. 2017, 123 pages.

Samsung, "TS 23.502: AF Influenced PDU Session Modification Procedure", S2-171996, SA WG2 Meeting #120, Mar. 27-31, 2017, 2 pages.

Samsung, "TS 23.502: PCF Needs to Know UE Location for AF Influence Traffic Steering", S2-175941, SA WG2 Meeting #122bis, Aug. 21-25, 2017, 4 pages.

European Search Report dated Oct. 24, 2019 issued in counterpart application No. 18790225.9-1214, 18 pages.

* cited by examiner

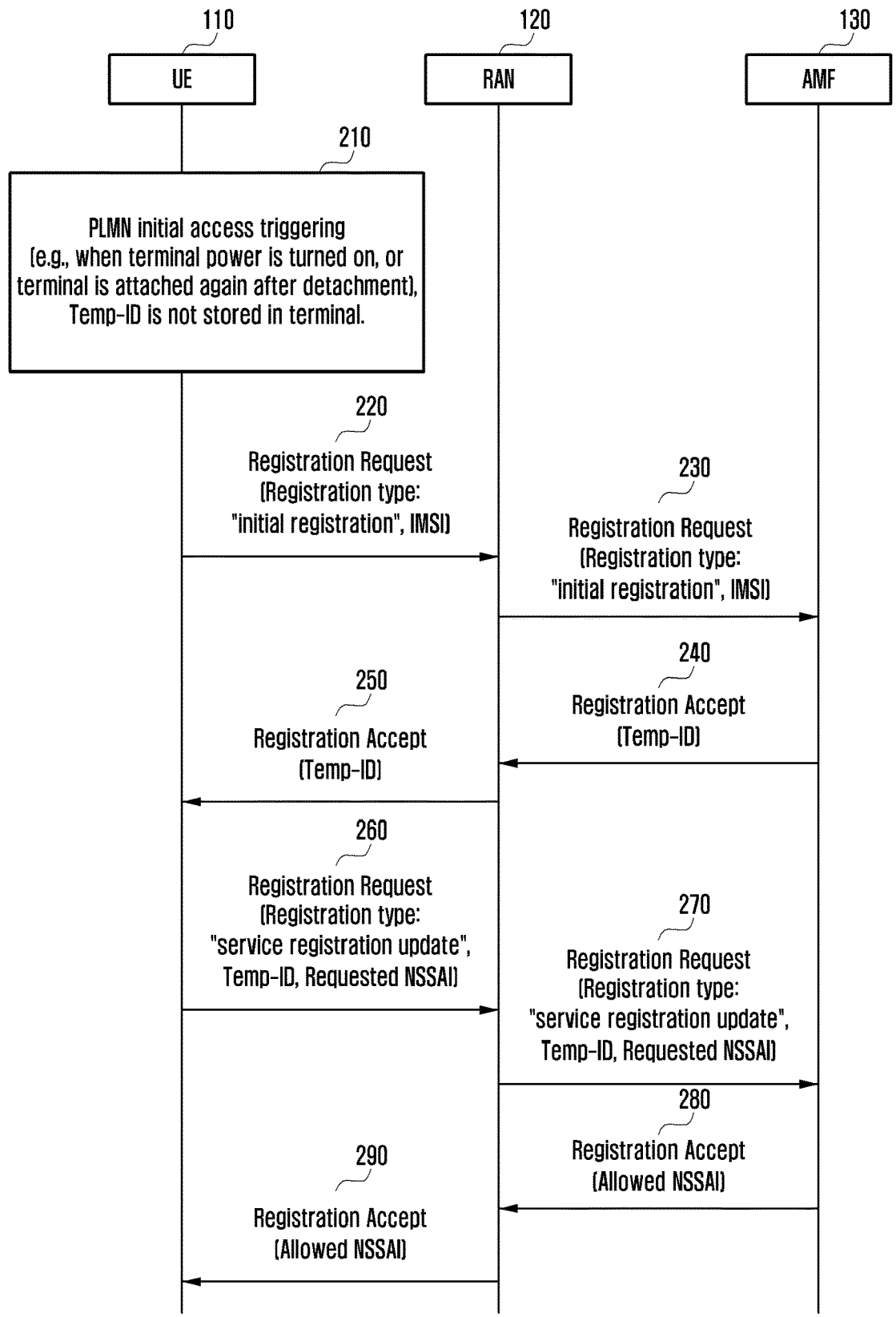

METHOD AND APPARATUS FOR REGISTRATION TYPE ADDITION FOR SERVICE NEGOTIATION

CROSS-REFERENCE TO RELATED APPLICATION(S)

This application is based on and claims priority under 35 U.S.C. § 119 to Korean Patent Applications No. 10-2017-0054432, filed on Apr. 27, 2017, and No. 10-2017-0114984 filed on Sep. 8, 2017, in the Korean Intellectual Property Office, the entire disclosure of each of which is incorporated by reference herein in its entirety.

BACKGROUND

1. Field

The present disclosure relates generally to a method for selecting a non-3 gpp interworking function (N3IWF) by a terminal while accessing a 5G network through a non-3 gpp access while the terminal is already accessed to the 5G network through a 3 gpp access, and more particularly an apparatus and method for steering a protocol data unit (PDU) session associated with traffic routed to a selected user plane function (UPF).

2. Description of the Related Art

In order to meet increasing demands for wireless data traffic after commercialization of 4G communication systems, efforts have been made to develop an improved 5G or pre-5G communication system. The 5G or pre-5G communication system may also be referred to as a beyond 4G network communication system or a post Long-Term Evolution (LTE) system.

In order to achieve high data rates, implementation of a 5G communication system in an ultrahigh frequency (mm-Wave) band (e.g., a 60 GHz band) has been considered. In order to mitigate a path loss of radio waves and to increase transfer distances of the radio waves in the ultrahigh frequency band, technologies such as beamforming, massive multiple-input and multiple-output (MIMO), full dimension MIMO (FD-MIMO), array antennas, analog beamforming, and large scale antennas for the 5G communication system have been discussed.

Further, for network improvements in the 5G communication system, technology developments have been made for an evolved small cell, advanced small cell, cloud radio access network (RAN), ultra-dense network, device to device communication (D2D), wireless backhaul, moving network, cooperative communication, coordinated multi-points (CoMP), and reception interference cancellation. In addition, in the 5G system, hybrid frequency shift keying (FSK) and quadrature amplitude modulation (QAM) (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

Additionally, the Internet, which is a human centered connectivity network where humans generate and consume information, is now evolving to into the Internet of things (IoT), where distributed entities, i.e., things, exchange and process information. The Internet of everything (IoE), which is a combination of the IoT technology and big data processing technology through connection with a cloud server, has also emerged. As technology elements, such as sensing technology, wired/wireless communication, and network infrastructure, service interface technology, and security technology, have been demanded for IoT implementation, a sensor network for machine-to-machine connection, machine-to-machine (M2M) communication, machine type communication (MTC), etc., have been recently researched.

An IoT environment may provide intelligent Internet technology services that create a new value to human life by collecting and analyzing data generated among connected things. The IoT may be applied to a variety of fields including a smart home, a smart building, a smart city, a smart car or connected cars, a smart grid, health care, smart appliances, and advanced medical services through convergence and combination between the existing information technology (IT) and various industries.

Accordingly, various attempts have been made to apply the 5G communication system to IoT networks. For example, technologies of a sensor network, M2M communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

The 5G system is expected to support increased various services as compared with the existing 4G system. For example, most representative services may be enhanced mobile broad band (eMBB), ultra-reliable and low latency communication (URLLC), massive machine type communication (mMTC), evolved multimedia broadcast/multicast service (eMBMS), etc. A system providing the URLLC service may be referred to as "a URLLC system," and a system providing the eMBB service may be referred to as "an eMBB system."

SUMMARY

An aspect of the present disclosure is to provide a method for changing a slice of a terminal while the terminal is registered in a 5G core network (CN) using a network slice service.

Further, if a terminal intends to access a 5G network through a non-3 gpp access in a state where the terminal is accessing the 5G network through a 3 gpp access, the terminal selects an N3IWF, and attempts an access to the 5G network through the selected N3IWF. In this case, depending on in what PLMN the terminal should discover and select the N3IWF during the selection of the N3IWF, it is determined whether registration of the terminal can be made using the same AMF through the 3 gpp access and the non-3 gpp access. Accordingly, there is a need for schemes to grasp what method the terminal discovers and selects the N3IWF through.

Another aspect of the present disclosure is to provide a 5G core network that configures as a task in a core network a function in which an application server (AS) providing a service to a terminal requests a specific condition of the terminal from the core network, and automates and processes the request from the terminal in accordance with a location and a state of the terminal.

In accordance with an aspect of the present disclosure, a communication method for a policy control function (PCF) device is provided. The communication method includes receiving, from an application function (AF), a first message including information on identifying a user plane function (UPF) toward which traffic routing is applied and information on a spatial condition of a terminal location; receiving, from a session management function (SMF), a second message including information on a change of the terminal location in an area of interest determined based on the spatial condition; selecting a UPF based on the information on identifying the UPF and the information on the change of the terminal location; and transmitting, to the SMF, a third message including information on the selected UPF for steering a protocol data unit (PDU) session associated with the traffic to the selected UPF.

In one embodiment, the receiving of the second message includes transmitting, to the SMF, a fourth message to subscribe to the SMF to receive a notification about the change of the terminal location in the area of interest; and receiving, from the SMF, the second message including information indicating that the terminal entered the area of interest or the terminal left the area of interest.

In one embodiment, the method further includes transmitting, to the AF, a fifth message in response to the first message; and storing the information on identification of the UPF toward which the traffic routing is applied and the information on the spatial condition of the terminal location.

In one embodiment, the first message further includes at least one of identification of a terminal, dada network name, network slice information, or application identifier.

In accordance with another aspect of the present disclosure, a communication method is provided for a session management function (SMF). The communication method includes identifying that a terminal location is changed in an area of interest; transmitting, to a policy control function (PCF), a first message including information on the change of the terminal location in the area of interest, in response to identifying that the terminal location is changed in the area of interest; and receiving, from the PCF, a second message including information on a user plane function (UPF) for steering a protocol data unit (PDU) session associated with traffic to the UPF.

In one embodiment, the transmitting of the first message includes receiving, from the PCF, a third message for the SMF to transmit notification about the change of the terminal location in the area of interest to the PCF; determining whether the terminal entered the area of interest or the terminal left the area of interest; and transmitting, to the PCF, the first message including information indicating that the terminal entered the area of interest or the terminal left the area of interest, in response to a determination that the terminal entered the area of interest or the terminal left the area of interest.

In one embodiment, the method further includes steering the PDU session associated with the traffic to the UPF.

In one embodiment, the third message includes information on the area of interest.

In accordance with another aspect of the present disclosure, a policy control function (PCF) is provided, which includes a transceiver; and a controller coupled with the transceiver and configured to receive, from an application function (AF), a first message including information identifying a user plane function (UPF) toward which traffic routing is applied and information on a spatial condition of a terminal location, receive, from a session management function (SMF), a second message including information on a change of the terminal location in an area of interest determined based on the spatial condition, select a UPF based on the information identifying the UPF and the information on the change of the terminal location, and transmit, to the SMF, a third message including information on the selected UPF for steering a protocol data unit (PDU) session associated with the traffic to the selected UPF.

In accordance with another aspect of the present disclosure, a session management function (SMF) is provided, which includes a transceiver; and a controller coupled with the transceiver and configured to identify that a terminal location is changed in an area of interest, transmit, to a policy control function (PCF), a first message including information on the change of the terminal location in the area of interest, in response to identifying that the terminal location is changed in the area of interest, and receive, from the PCF, a second message including information on a user plane function (UPF) for steering a protocol data unit (PDU) session associated with traffic to the UPF.

According to an embodiment of the present disclosure, a registration type for changing a slice can be proposed.

Further, if a terminal intends to perform an access through a non-3 gpp access in a state where the terminal is registered through a 3 gpp access, it is determined whether the terminal registration can be managed using the same AMF in accordance with a method for selecting an N3IWF. Accordingly, resources can be efficiently managed in the 5G network, or it becomes possible to support a HO of a PDU session between the non-3 gpp access and the 3 gpp access, and thus service support can be smoothly performed.

According to the present disclosure, a 5G core network configures a function in which an AS providing a service to the terminal requests a specific condition of the terminal in a bundle from the core network, and the core network automates and processes the request from the terminal in accordance with the location and the state of the terminal. Unlike a case where the core network notifies the AS of the terminal state every time, and accordingly receives and processes the request from the AS every time, according to the present disclosure, once the core network configures a specific event for a specific terminal and a corresponding operation and rule, the core network can perform the corresponding operation as soon as it grasps the terminal state, and thus can provide the service without separately depending on the request from the AS. Accordingly, signaling between the AS and the core network can be reduced, and time required for providing the corresponding service to the terminal can be shortened.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 2 is a signal flow diagram illustrating an initial registration with a Temp-ID process according to an embodiment;

DETAILED DESCRIPTION

Figure 1:
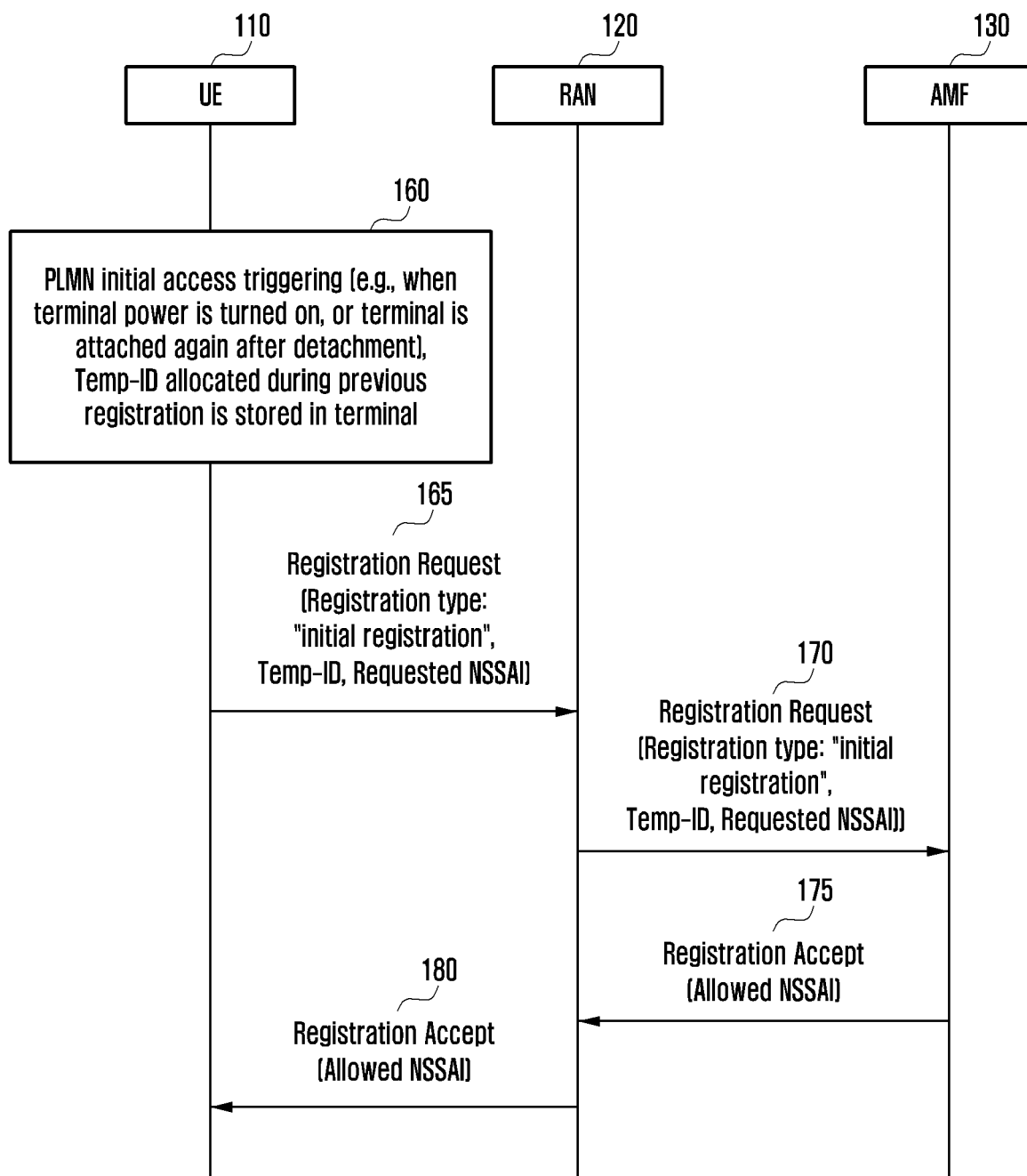
FIG. 1 is a signal flow diagram illustrating an initial registration without a temporary identifier (Temp-ID) process according to an embodiment.

Hereinafter, various embodiments of the present disclosure will be described in detail with reference to the accompanying drawings. In the accompanying drawings, the same drawing reference numerals may be used for the same elements across various figures. Further, well-known functions or configurations incorporated herein will be omitted to avoid obscuring the subject matter of the present disclosure in unnecessary detail.

Although the terms used herein are defined in consideration of functions in the embodiments, the terms may be changed according to the intention of a user or an operator, or customs. Therefore, the present disclosure should be understood, not simply by the terms used, but based on the contents of the whole description of the present disclosure.

In the embodiments of the present disclosure described below, although constituent elements included in the present disclosure may expressed in a singular form or in a plural form, such a singular or plural expression is selected to suit a situation presented for convenience in explanation, and thus the present disclosure is not limited to such singular or plural constituent elements. Even plural constituent elements may be expressed in a singular form, and even a single constituent element may be expressed in a plural form.

Although communications standards organized by the 3GPP are referenced in describing embodiments of the present disclosure, the present disclosure may also be applied to other communication systems having similar technical backgrounds or channel types, through slight modifications thereof. Herein, the terms slices, services, network slices, network services, application slices, and application services may be interchangeably used.

Additionally, the terms "service" and "system" may be interchangeably used herein.

Embodiment 1

If a specific condition is generated, a terminal (UE) 110 sends a registration request message to an access and mobility management function (AMF) 130 of a 5G core network (CN).

FIG. 1 is a signal flow diagram illustrating an initial registration without a Temp-ID process according to an embodiment.

Referring to FIG. 1, indicates a case where a power of the terminal 110 is turned on, or the terminal 110 detached from a core network is again attached to the core network.

The terminal 110 configures a registration type to "initial registration" as it sends a registration request message to an AMF 130 (through a base station (RAN) 120) (operations 165 and 170). In this case, if security-related information and a UE temporary ID (hereinafter, Temp-ID) received during previous registration are stored in the terminal 110 (160), the terminal 110 may include the stored Temp-ID in the registration request message. If the Temp-ID is included in the registration request message, an international mobile subscriber identity (IMSI) that is a permanent ID of the terminal 110 may not be included. In this case, network slice information that the terminal 110 intends to use after accessing the 5G CN may be included in the registration request message. That is, when the terminal 110 sends the registration request message that does not include the IMSI, but includes the Temp-ID, network slice selection assistance information (NSSAI) that is network slice information to be used by the terminal 110 or requested NSSAI may be included in the registration request message. The AMF 130 having received the registration request message determines slices to be provided to the terminal 110, i.e., allowed NSSAI, in consideration of subscription information of the terminal 110, the policy of a mobile communication service provider, and a 5G RAN 120/CN network situation, and transfers a registration accept message including the corresponding information to the terminal 110 (through the RAN 120) (operations 175 and 180).

FIG. 2 is a signal flow diagram illustrating an initial registration with a Temp-ID process according to an embodiment.

FIG. 2 indicates the same case as the case of FIG. 1 in which the power of the terminal 110 is turned on, or the terminal 110 detached from the core network is again attached to the core network, but FIG. 2 further indicates a case where a Temp-ID allocated during the previous registration and security information are not stored in the terminal 110 (210).

The terminal 110 configures a registration type to "initial registration" as it sends a registration request message to an AMF 130 (through a base station (RAN) 120) (operations 220 and 230). Since the Temp-ID allocated during the previous registration is not stored in the terminal 110, the terminal 110 includes an IMSI in the registration request message to be transmitted. The AMF 130 having received the registration request message allocates the Temp-ID to the terminal 110, and sends a registration accept message including the Temp-ID to the terminal 110 (operations 240 and 250). Through the operations 220 to 250, authentication and security setup between the terminal 110 and the CN are performed. Thereafter, a message that the terminal 110 sends to a 5G RAN 120/CN 130 becomes an integrity protected NAS. The terminal 110 includes slice information intended to be used in the registration request message, and transmits the registration request message to the AMF 130 (operations 260 and 270). The registration type of the registration request message in operations 260 and 270 is configured to be different from the "initial registration" that is the registration type of the registration request message transmitted by the terminal in operation 220. That is, examples of the different registration type may be "service registration update", "capability registration update", "slice registration update", and "service negotiation update". The registration request message includes the Temp-ID allocated in operation 250 and requested NSSAI that is slice information that the terminal 110 intends to use. The AMF 130 having received the registration request message determines slices to be provided to the terminal 110, that is, allowed NSSAI, in consideration of subscription information of the terminal 110, the policy of a mobile communication service provider, and a 5G RAN 120/CN network situation, and transfers a registration accept message including the corresponding information to the terminal 110 (operations 280 and 290).

Figure 3A:
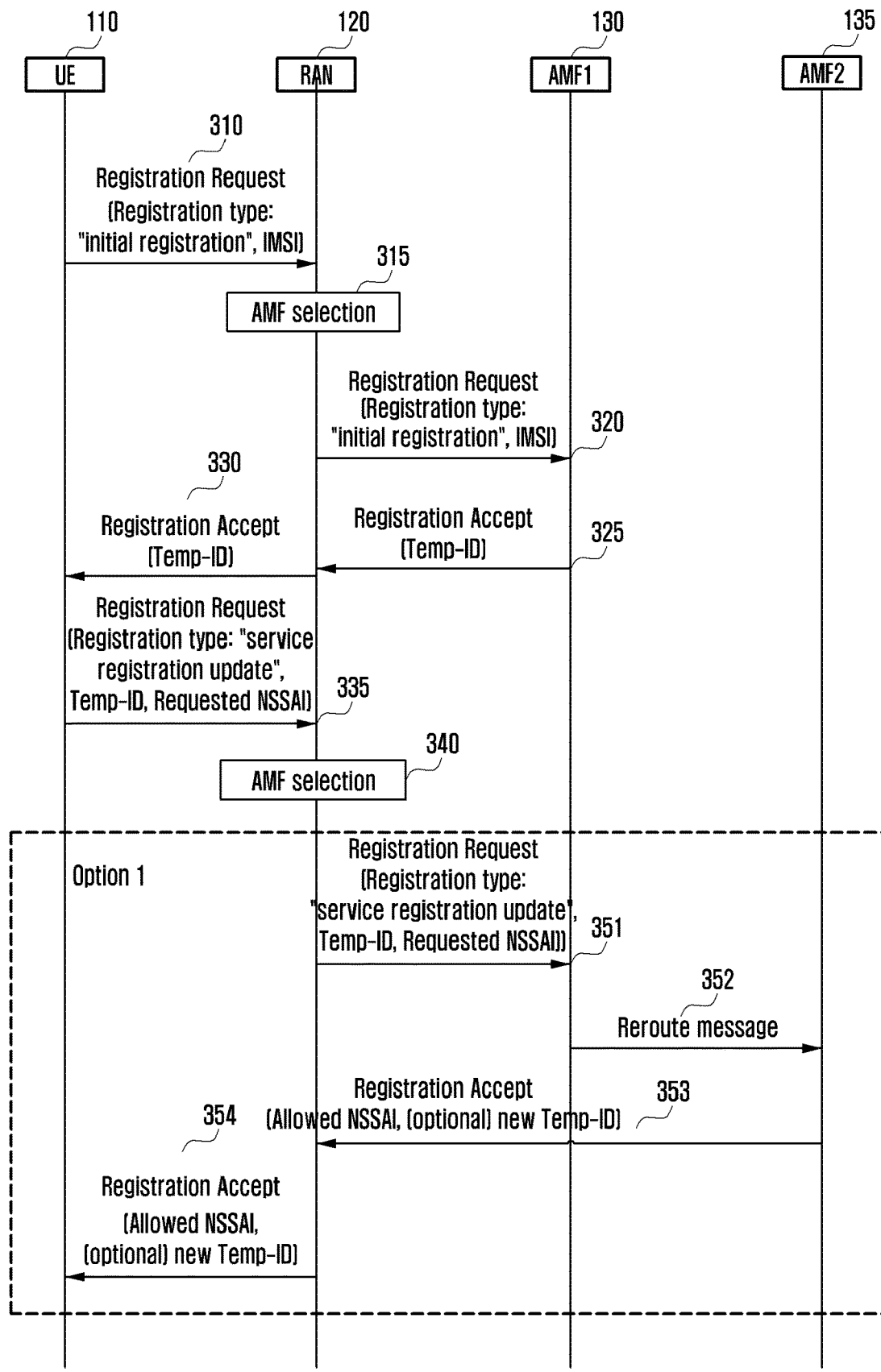
FIGS. 3A and 3B are signal flow diagrams illustrating an initial registration with an AMF relocation process according to an embodiment.
Figure 3B:
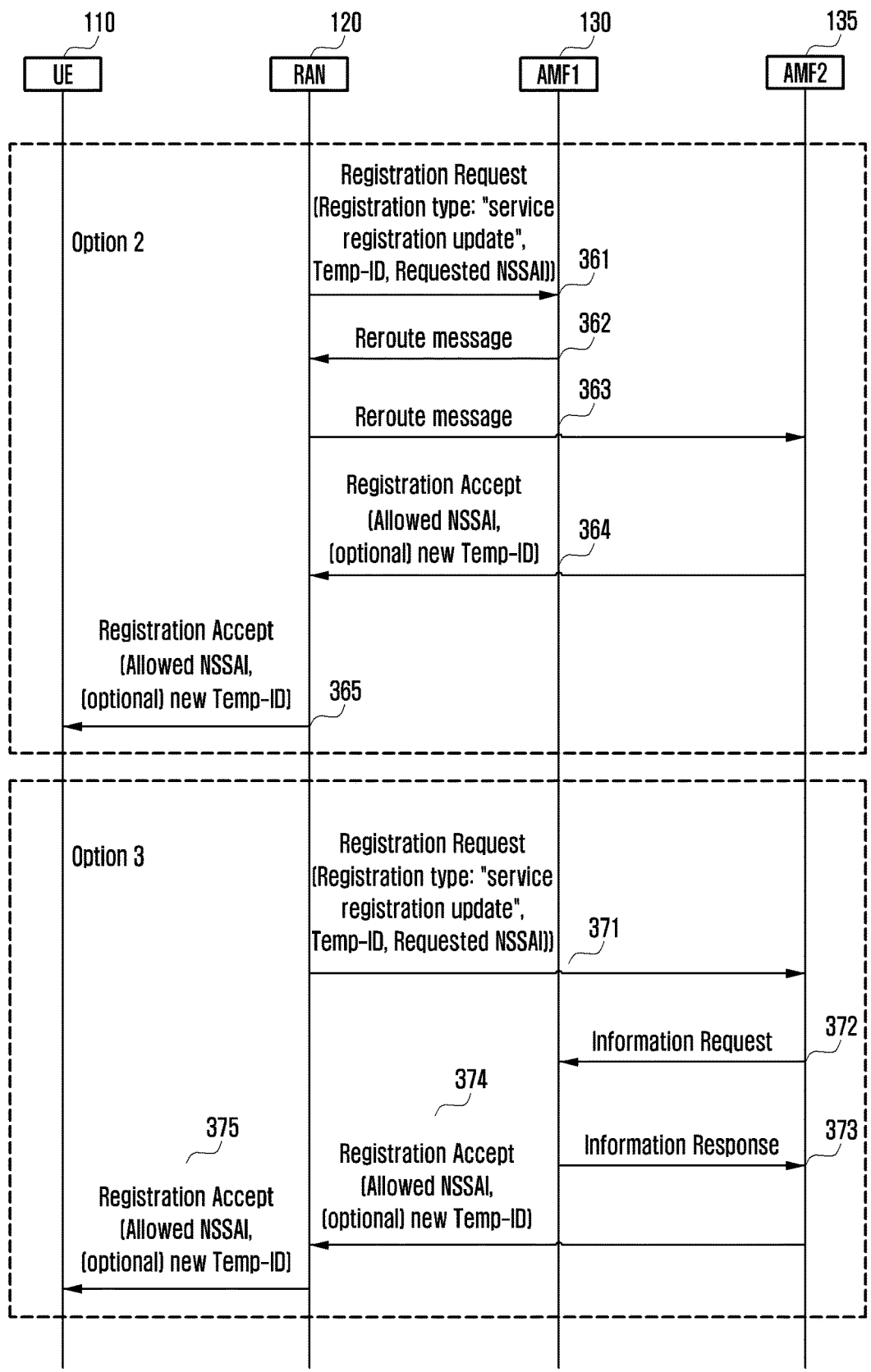

FIGS. 3A and 3B are signal flow diagrams illustrating an initial registration with an AMF relocation process according to an embodiment. Specifically, FIGS. 3A and 3B illustrate an AMF selection method of a RAN 120 and various embodiments in which a registration request message is rerouted to a new AMF during a registration process as illustrated in FIG. 2.

Referring to FIG. 3A, in operation 310, since the registration request does not include information for AMF selection (e.g., Temp-ID and requested NSSAI), the RAN 120 having received the registration request message from the terminal 110 selects AMF1 130 based on load balancing and local policy (operation 315), and transmits the registration request message to the AMF1 130 at operation 320. The AMF1 130 having received the transferred registration request message allocates the Temp-ID to the initially-connected terminal 110, and transmits a registration accept message including the corresponding Temp-ID to the terminal 110 (operations 325 and 330). The terminal sends the registration request message to the AMF for slice usage, and the corresponding registration request message to be transmitted to the RAN 120 includes the Temp-ID allocated from the AMF1 130 and requested NSSAI that is slice information that the terminal 120 desires to use (operation 335). The RAN 120 having received the registration request message selects the AMF using the information included in the corresponding message (operation 340). In FIGS. 3A and 3B, three kinds (options) of AMF selection methods are illustrated.

Option 1 and option 2 correspond to the RAN 120 selecting the AMF in view of the Temp-ID included in the registration request message. Option 3 corresponds to the RAN 120 selecting the AMF in view of the requested NSSAI included in the registration request message.

In option 1 and option 2, the RAN 120 transfers the registration request message through selection of the related AMF in view of the Temp-ID included in the message and in view of an AMF group, AMF group ID, or AMF ID included in the Temp-ID (operations 351 and 361). In this case, since the AMF allocated with the Temp-ID is the AMF1 130, AMF1 130 is selected, or the message is transferred to the AMF of the AMF group to which the AMF1 130 belongs. The AMF 130 having received the registration request message at operation 351 or 361 or the AMF of the AMF group to which the AMF1 130 belongs determines allowed NSSAI which is slice information that can be provided to the terminal 110 based on the requested NSSAI included in the registration request message, subscription information of the terminal 110, and the policy of a mobile communication service provider. If the AMF1 130 or the AMF of the AMF group to which the AMF1 130 belongs is unable to provide the corresponding slice (allowed NSSAI), the message is forwarded to another AMF2 135 that can provide the corresponding slice. Operation 353 corresponds to a case where the AMF1 130 directly reroutes the message to the AMF2 135, and operations 362 and 363 correspond to a case where the AMF1 130 reroutes the message to the AMF2 135 through the RAN 120. At operations 353, 362, and 363, a reroute message includes the registration request message sent by the terminal 110 and the allowed NSSAI. The AMF2 135 having received the reroute message processes the registration request message included in the reroute message. The allowed NSSAI information can be corrected based on the subscription information of the terminal 110, and the policy of the mobile communication service provider. That is, the slice to be provided to the terminal 110 is finally decided. If necessary, a new Temp-ID may be allocated. The AMF2 135 transmits to the terminal 110 a registration accept message including the finally decided allowed NSSAI and a new Temp-ID if a Temp-ID is newly allocated (operations 353, 354, 364, and 365).

In option 3, the RAN 120 transfers the registration request message through selection of the related AMF that can provide the corresponding slice in view of the requested NSSAI included in the message (operation 371). In this case, the AMF2 135 is selected. The AMF2 135 having received the registration request message requests terminal related information from the AMF1 130 allocated to the corresponding terminal 110 in view of the Temp-ID included in the message (operation 372). The AMF1 130 provides the terminal related information (UE context, MM context, and SM context) to the AMF2 135 (operation 373). The AMF2 135 determines the allowed NSSAI which is slice information that can be provided to the terminal 110 based on the requested NSSAI included in the registration request message, subscription information of the terminal 110, and the policy of a mobile communication service provider. If necessary, a new Temp-ID may be allocated. The AMF2 135 transmits to the terminal 110 a registration accept message including the finally decided allowed NSSAI and a new Temp-ID if a Temp-ID is newly allocated (operations 374 and 375).

Figure 4:
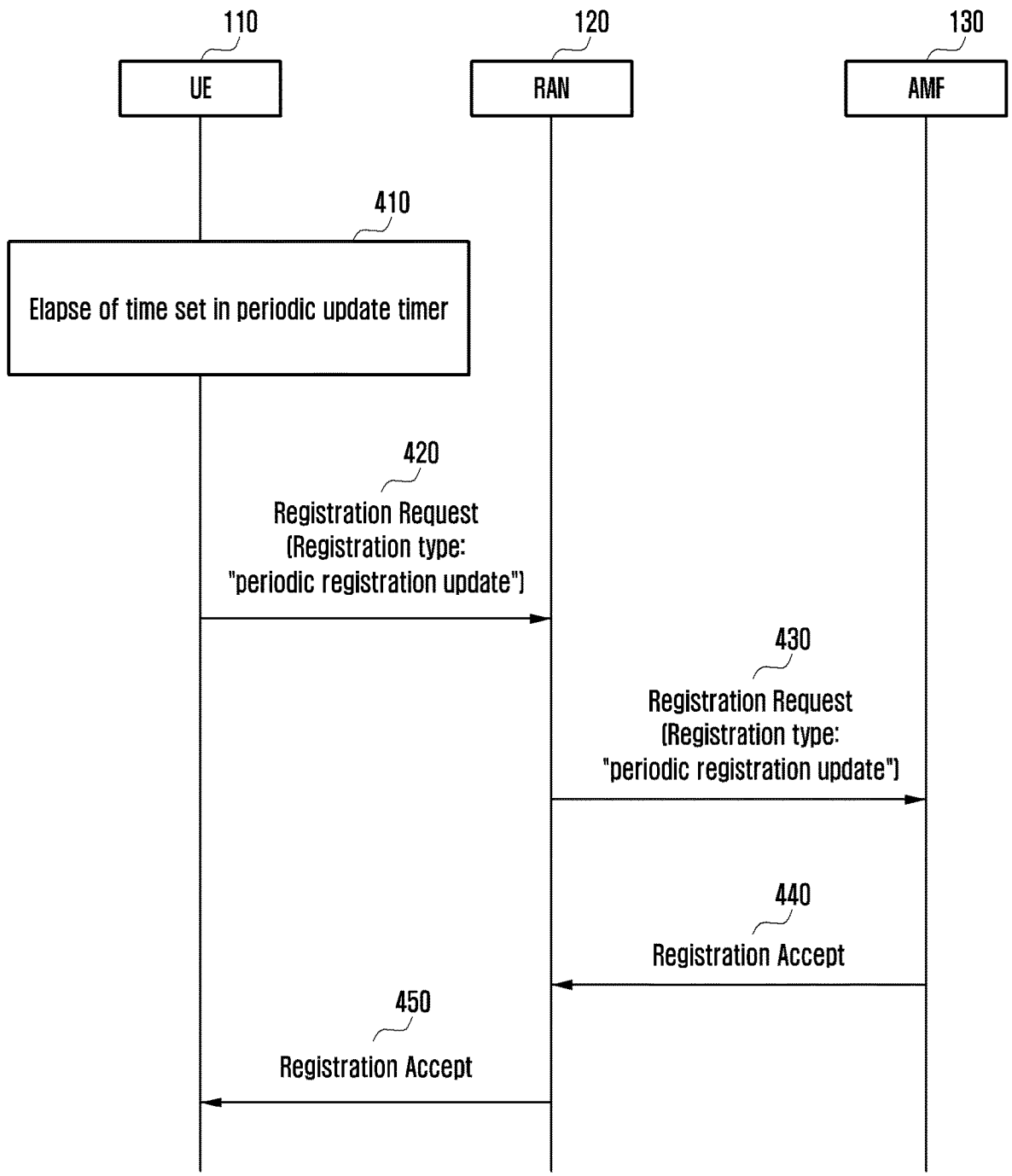
FIG. 4 is a signal flow diagram illustrating a periodic tracking area update (TAU) process according to an embodiment.

FIG. 4 is a signal flow diagram illustrating a periodic TAU process according to an embodiment.

Referring to FIG. 4, a time set in a periodic update timer of the terminal 110 elapses (operation 410), and the terminal 110 sends a registration request message to an AMF 130 (through a RAN 120) (operations 420 and 430). The terminal 110 configures a registration type to "periodic registration update" in the registration request message. Then, in response to this, the AMF 130 may transmit a registration accept message to the terminal 110 (operations 440 and 450).

Figure 5:
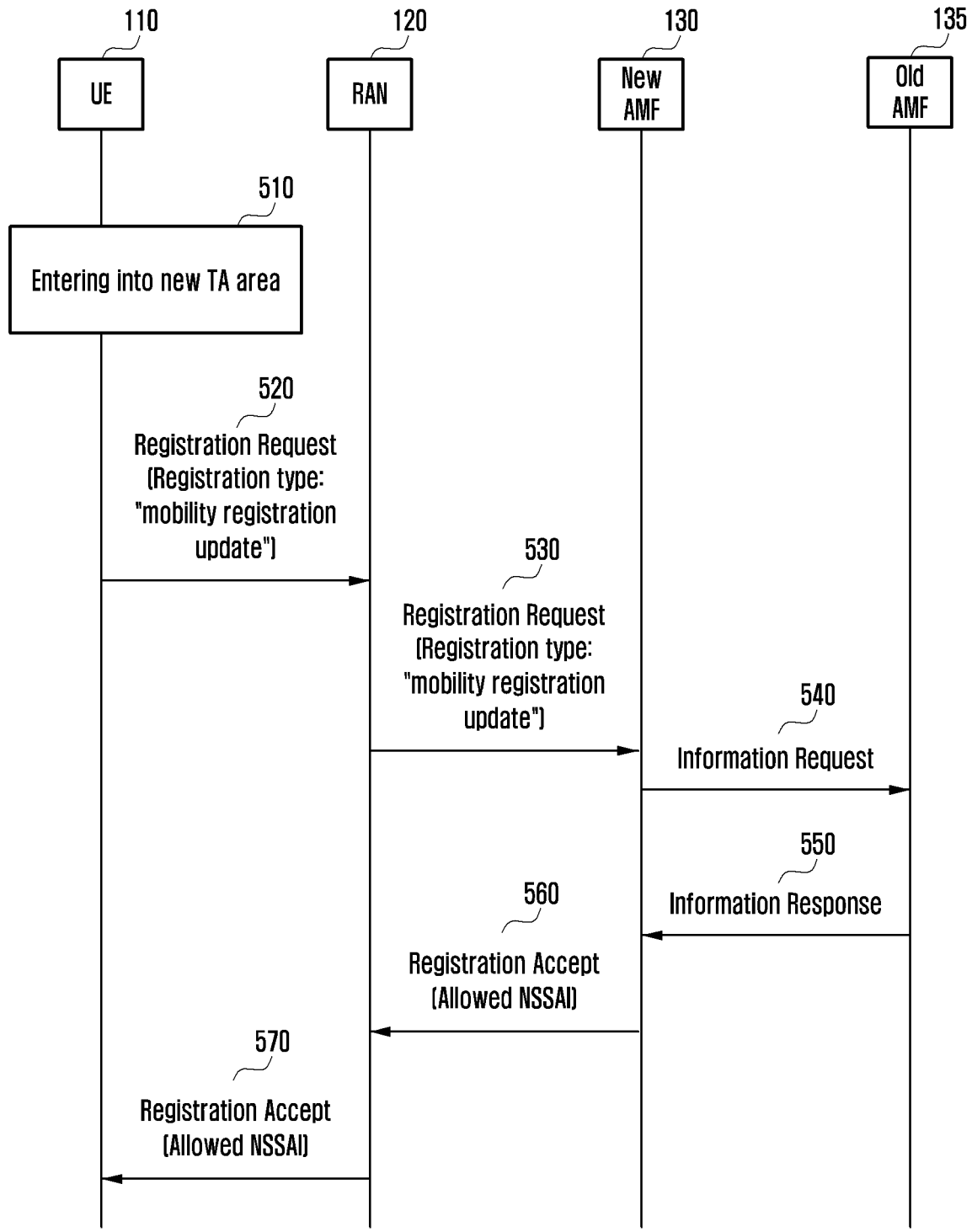
FIG. 5 is a signal flow diagram illustrating a TAU process according to an embodiment.

FIG. 5 is a signal flow diagram illustrating a TAU process according to an embodiment.

Referring to FIG. 5 the terminal 110 sends a registration request message when the terminal 110 moves and enters into an area that is not in a tracking area identity (TAI) list (operation 510). The terminal 110 configures a registration type to "mobility registration update" as sensing the registration request message (operations 520 and 530).

If the existing AMF supporting the terminal 110 is changed from an old AMF 135 to a new AMF 130, the new AMF 130 requests terminal information from the old AMF 135 (operation 540). The old AMF 135 may provide network slice information in addition to UE context, MM context, and SM context that are terminal related information (operation 550). The network slice information may include requested NSSAI previously requested by the terminal 110 (i.e., requested NSSAI sent by the terminal 110 to the old AMF 135 during registration) and allowed NSSAI information provided by the old AMF 135 to the terminal 110.

If the existing AMF supporting the terminal 110 is maintained as it is, the new AMF 130 and the old AMF 135 of FIG. 5 correspond to the same AMF, and thus operations 540 and 550 are omitted. That is, the new AMF 130 has information related to the terminal 110 and network slice information.

The new AMF 130 allocates a new registration area (TAI list) to the terminal 110. Further, the new AMF 130 determines the allowed NSSAI which is slice information that can be provided to the terminal 110 based on slice information received from the old AMF 135, subscription information of the terminal 110, and the policy of a mobile communication service provider, and transmits the allowed NSSAI to the terminal 110 (operations 560 and 570).

Three kinds of allowed NSSAI determined by the new AMF 130 are possible. First is determined based on slices that can be provided by the AMF 130 in a registration area newly allocated to the terminal 110 and the subscription information of the terminal 110. For example, if the terminal 110 can subscribe and use slice 1, slice 2, slice 3, and slice 4, and the AMF 130 can currently provide slice 1, slice 2, slice 3, and slice 5, the final allowed NSSAI may include slice 1, slice 2, and slice 3. In this case, slice information received from the old AMF 135 in operation 550 is not used.

Second is determined based on slices that can be provided by the AMF 130 in a registration area newly allocated to the terminal 110, the subscription information of the terminal 110, and the allowed NSSAI received from the old AMF 135. For example, if the terminal 110 can subscribe and use slice 1, slice 2, slice 3, and slice 4, the AMF 130 can currently provide slice 1, slice 2, slice 3, and slice 5, and the allowed NSSAI received from the old AMF 135 includes slice 3 and slice 4, the final allowed NSSAI includes slice 3. In this case, the allowed NSSAI received from the old AMF 135 may be information included in the registration request message sent by the terminal 110 in operations 520 and 530, or may be information brought from the old AMF 135 in operation 550.

Third is determined based on slices that can be provided by the AMF 130 in a registration area newly allocated to the terminal 110, the subscription information of the terminal 110, and the requested NSSAI. For example, if the terminal 110 can subscribe and use slice 1, slice 2, slice 3, and slice 4, the AMF 130 can currently provide slice 1, slice 2, slice 3, and slice 5, and the requested NSSAI received from the old AMF 135 includes slice 2, slice 3, and slice 4, the final allowed NSSAI includes slice 2 and slice 3. In this case, the requested NSSAI may be a newly requested NSSAI included in the registration request sent by the terminal 110 in operations 520 and 530, or may be requested NSSAI previously requested by the terminal 110 and received by the new AMF 130 from the old AMF 135 in operation 550 (i.e., requested NSSAI sent by the terminal 110 to the old AMF during registration).

The finally decided allowed NSSAI sent in operations 560 and 570 may be the same as or different from the slices previously allocated and used by the terminal 110 (i.e., allowed NSSAI that the terminal 110 received from the old AMF 135 during registration in the old AMF 135).

If the allowed NSSAI finally decided by the new AMF 130 is the same as the allowed NSSAI that the existing old AMF 135 allocated to the terminal 110, the new AMF 130 may not include the allowed NSSAI in the registration accept message. That is, the terminal 110 receives the message at operation 570 in response to the message transmitted at operation 520, and if the allowed NSSAI is not included in the corresponding message, it can be known that the allowed NSSAI received from the existing old AMF 135 can be used as it is.

Further, if the allowed NSSAI finally decided by the new AMF 130 is the same as the allowed NSSAI that the existing old AMF 135 allocated to the terminal 110, the new AMF 130 may not include the allowed NSSAI in the registration accept message, but may include an indication indicating that they are the same. That is, the terminal 110 receives the message in operation 570, in response to the message transmitted in operation 520, and if the allowed NSSAI is not included in the corresponding message, but the indication is included therein, it can be known that the allowed NSSAI received from the existing old AMF 135 can be used as it is.

Further, if the allowed NSSAI finally decided by the new AMF 130 is the same as the allowed NSSAI that the existing old AMF 135 allocated to the terminal 110, the new AMF 130 may include the allowed NSSAI in the registration accept message.

Figure 6:
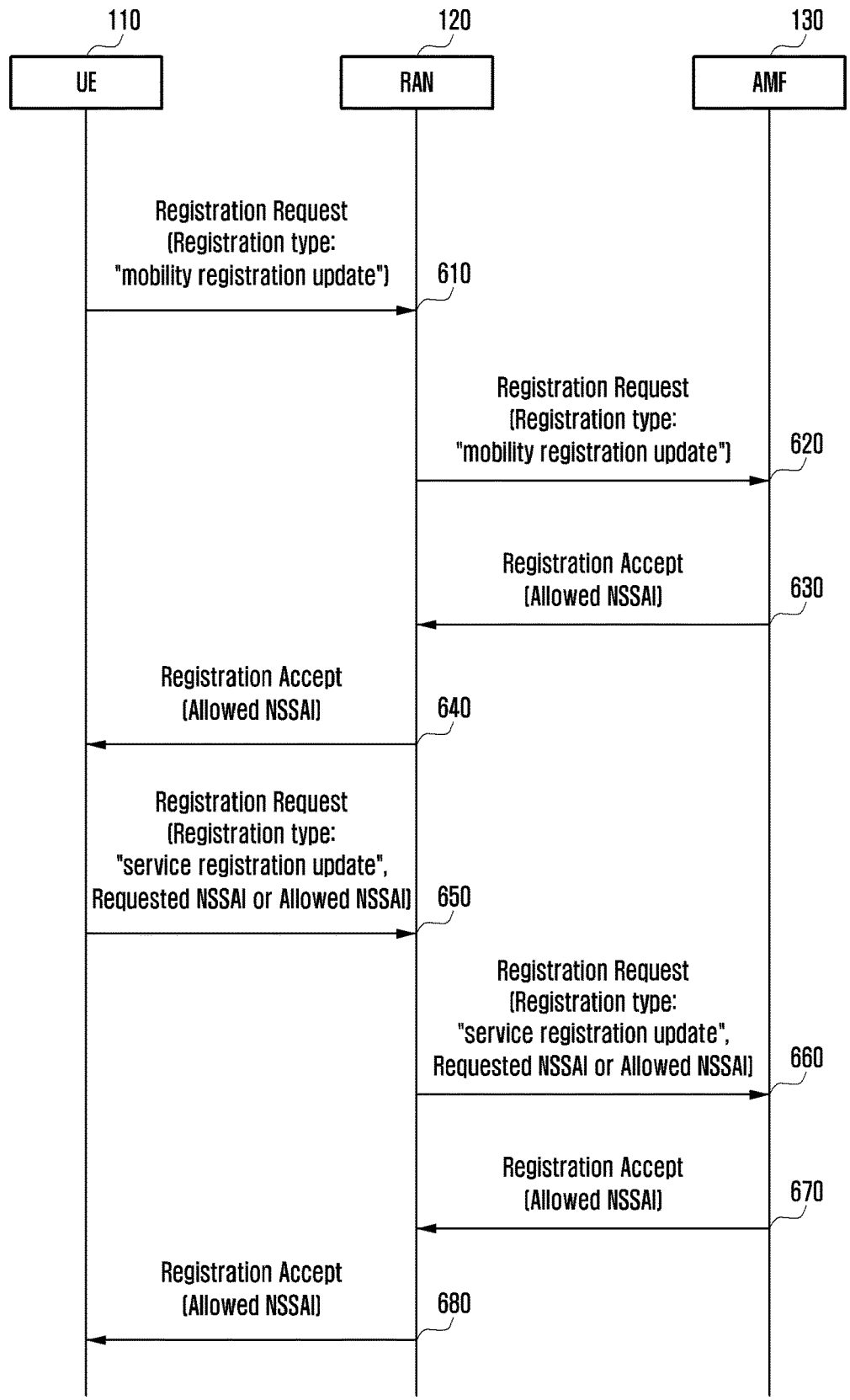
FIG. 6 is a signal flow diagram illustrating a TAU with a slice change process according to an embodiment.

FIG. 6 is a signal flow diagram illustrating a TAU with a slice change process according to an embodiment. Specifically, FIG. 6 indicates a case where the registration type is Registration type="mobility registration update", i.e., slices that can be used by the terminal 110 are changed due to a tracking area update (TAU). In operations 610 and 620, the terminal 110 may transmit the registration request message to the AMF 130, and in this case, it may configure the registration type to the mobility registration update. In operations 630 and 640, the AMF 130 transmits the registration accept message, via the RAN 120, to the terminal 110. The registration accept message includes the allowed NSSAI. At this time, the case where the slices are changed may be the case where the allowed NSSAI included in the registration accept message in operation 640 is different from the allowed NSSAI previously allocated to the terminal 110. The terminal 110 having received the registration accept message in operation 640 recognizes that the usable slices have been changed in a new registration area. In this case, the AMF 130 starts a slice change timer as it sends the registration request message in operation 630. The terminal 110 having received the registration accept message resends the registration request message to the AMF 130, and in this case, the registration type is configured to "service registration update" (operations 650 and 660). Further, an indication indicating the slice change cause may be configured to "NW-triggered slice change", and the configured indication may be included in the registration request message. Further, the registration type may be configured to "NW-triggered slice change". In this case, the above-described indication is not included. The registration request may include the allowed NSSAI received in operation 640. The AMF 130 having received the registration request message in operation 660 may recognize that the NSSAI value included in the registration request message is the allowed NSSAI value sent through the registration accept message in operation 630 in view of the indication value included in the registration request message or the registration type value, i.e., "NW-triggered slice change", and may omit the authentication process. In operations 670/680, the registration accept message is sent in response to the registration request message received in operations 650/660, and the finally decided allowed NSSAI may be or may not be included in the registration accept message. That is, because the allowed NSSAI sent by the network 130 in operation 630 is finally decided by the terminal 110 through resending thereof in operation 650, the slice authentication process performed by the existing AMF 130 can be reduced.

Figure 7:
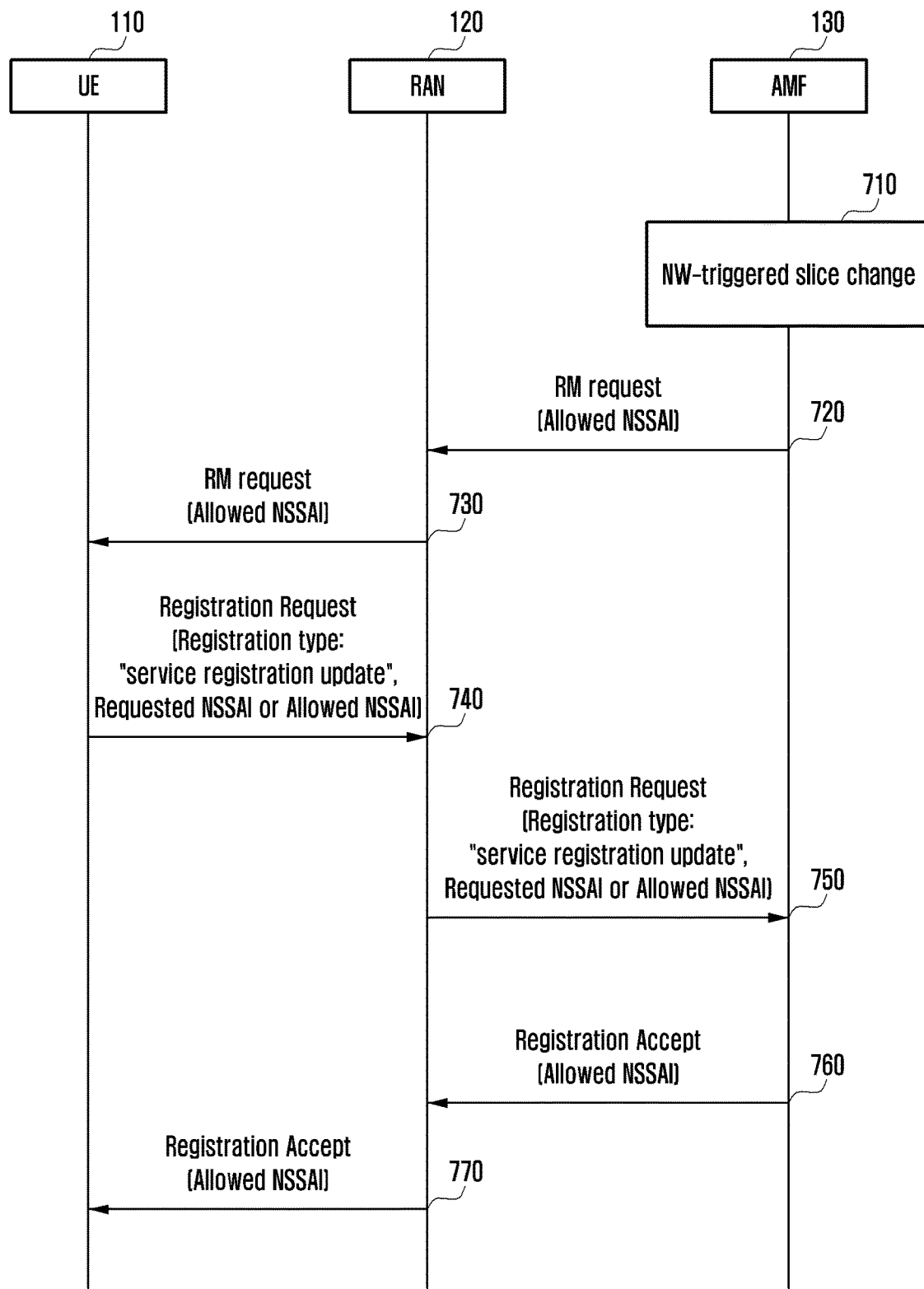
FIG. 7 is a signal flow diagram illustrating a network (NW)-triggered slice change process according to an embodiment.

FIG. 7 is a signal flow diagram illustrating an NW-triggered slice change process according to an embodiment.

FIG. 7 indicates a slice change triggered by a 5G CN (710). The AMF 130 sends the allowed NSSAI that is changed slice information to the terminal 110 at operations 720/730. In this case, the AMF 130 starts a slice change timer as it sends a registration management (RM) request message in operation 720. The terminal 110 having received the message resends the registration request message to the AMF 130, and in this case, the registration type is configured to "service registration update" (operations 740 and 750). Further, the indication indicating the slice change cause may be configured to "NW-triggered slice change", and the configured indication may be included in the registration request message. Further, the registration type may be configured to "NW-triggered slice change". In this case, the above-described indication is not included. The registration request may include the allowed NSSAI received at operation 730. The AMF 130 having received the message in operation 750 may recognize that the NSSAI value included in the registration request message is the allowed NSSAI value sent through the RM request in operation 720 in view of the indication value included in the registration request message or the registration type value that is "NW-triggered slice change", and may omit the authentication process. In operations 760/770, the AMF 130 may send to the terminal 110 the registration accept message in response to the registration request message in operations 650/660, and the finally decided allowed NSSAI may be or may not be included in the registration accept message. That is, because the allowed NSSAI sent by the network 130 in operation 720 is finally decided by the terminal 110 through resending thereof in operation 740, the slice authentication process performed by the existing AMF 130 can be reduced.

Figure 8:
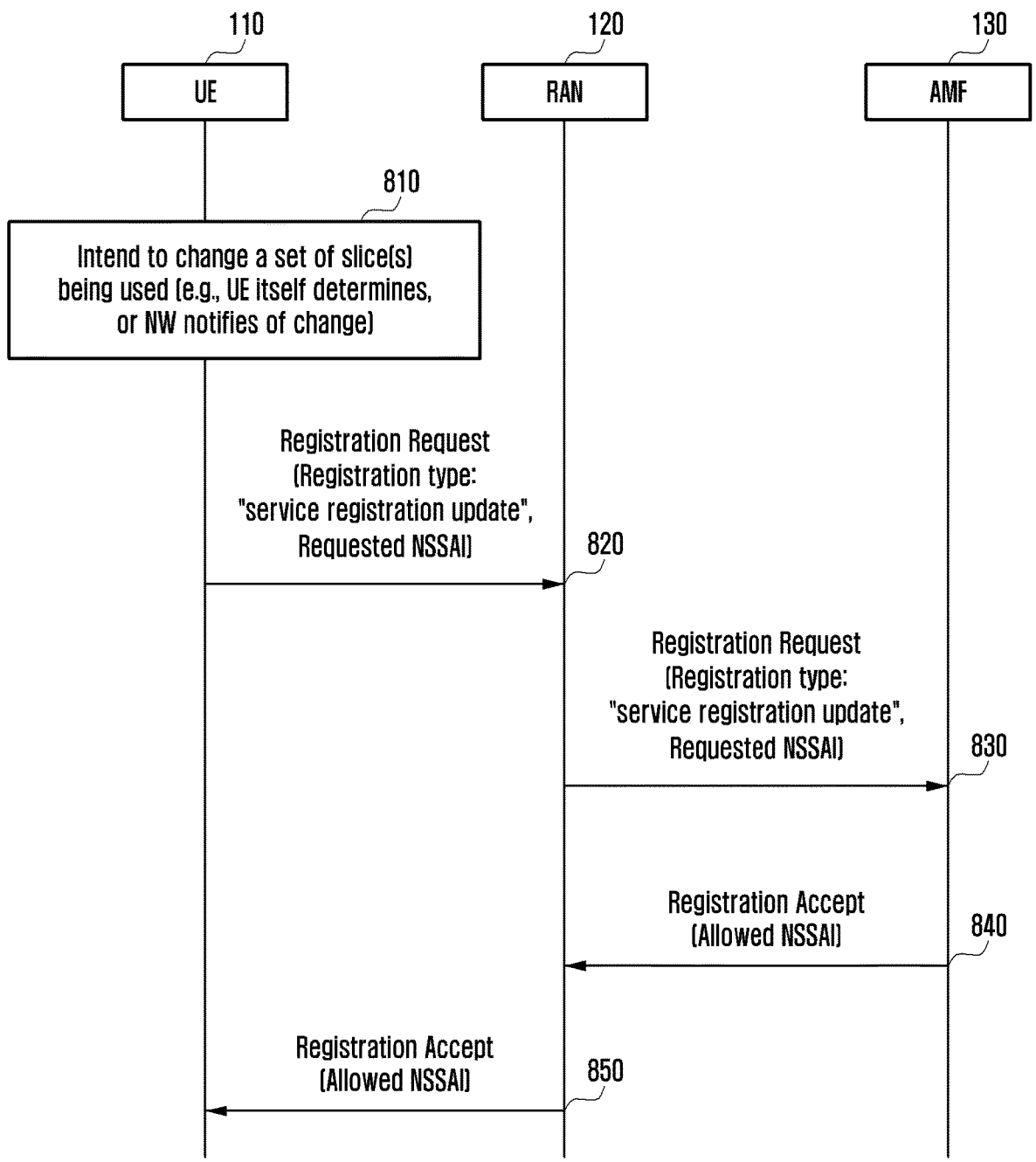
FIG. 8 is a signal flow diagram illustrating a user equipment (UE)-triggered slice change process according to an embodiment.

FIG. 8 is a signal flow diagram illustrating a UE-triggered slice change process according to an embodiment.

FIG. 8 indicates a UE-triggered slice change (810). If the terminal 110 desires to use another slice while using a slice service through accessing of a 5G CN (operation 810), it configures the registration type to "service registration update" as it sends a registration request message to an AMF 130 (operations 820 and 830). In this case, network slice selection assistance information (NSSAI) that is network slice information to be newly used by the terminal 110 or requested NSSAI may be included in the registration request message. The AMF 130 having received the registration request message determines slices to be provided to the terminal 110, i.e., allowed NSSAI, in consideration of subscription information of the terminal 110, the policy of a mobile communication service provider, and a 5G RAN 120/CN network situation, and transfers a registration accept message including the corresponding information to the terminal 110 (operations 840 and 850).

Embodiment 2

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the present disclosure is not limited to the terms to be described later, but other terms for calling subjects having equal technical meanings may be used.

Hereinafter, for convenience in explanation, terms and titles that are defined in the 5G system standards are used in the present disclosure. However, the present disclosure is not limited by the terms and titles, but can be equally applied to systems following other standards. Further, a non-3 gpp access includes an access through WiFi, and may be equally applied with respect to other accesses excluding the access through 5G.

Figure 9:
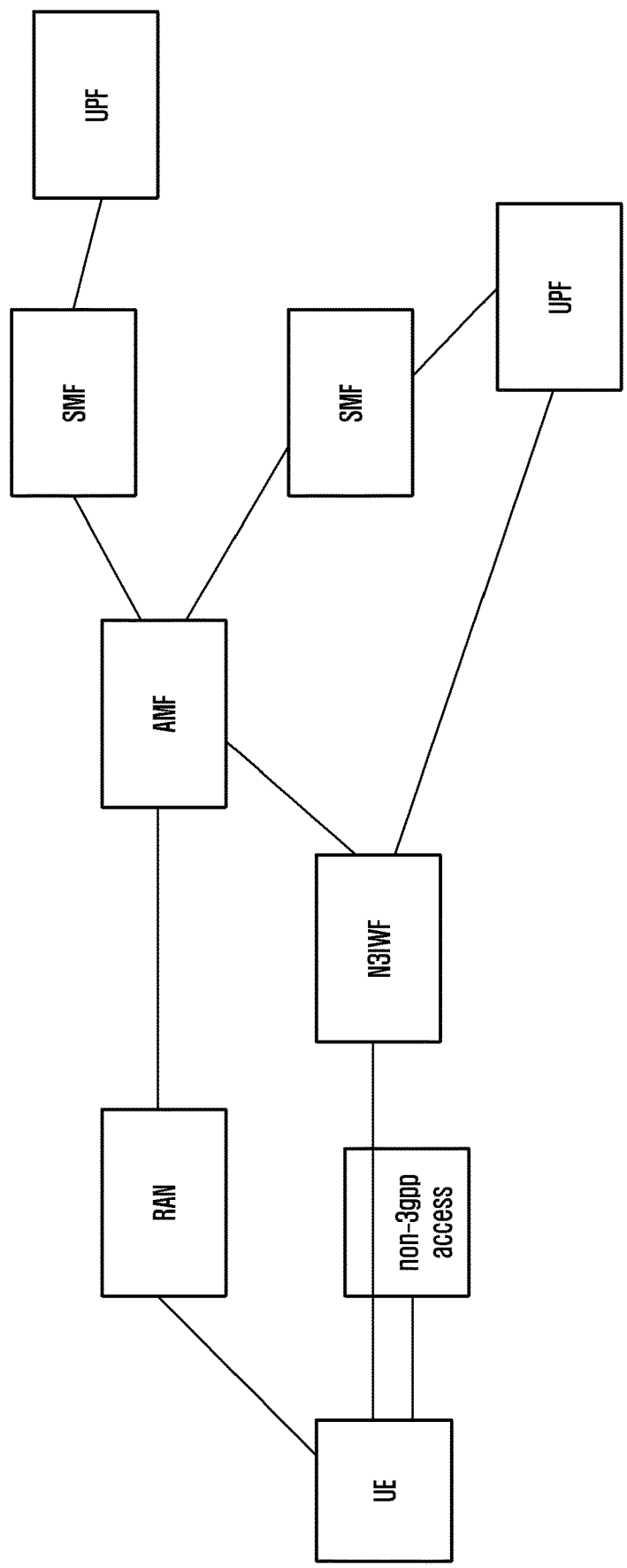
FIG. 9 illustrates a terminal accessing a 5G network of a PLMN through a 3 gpp access and a non-3 gpp access according to an embodiment.

FIG. 9 is a diagram illustrating an example of a structure in which a terminal accesses a 5G network of the same PLMN through a 3 gpp access and a non-3 gpp access. In particular, FIG. 9 also illustrates a structure in which the terminal uses a common AMF by performing an access through the 3 gpp access and the non-3 gpp access.

Referring to FIG. 9, if a terminal accesses a 5G core network through a 3 gpp access, that is, a 5G RAN, and simultaneously accesses the 5G core network of the same PLMN through a non-3 gpp access, a common AMF is selected. The terminal accesses the 5G core network through the 3 gpp access and the non-3 gpp access, and the common performs registration management with respect to the 3 gpp and non-3 gpp.

Here, an N3IWF is 5G core network equipment defined for smooth interlocking between the non-3 gpp access and the 5G core network, and is an entity that serves to forward a NAS message or data transmitted/received through the non-3 gpp access. The N3IWF is also called ngPDG. A session management function (SMF) is an entity serving to manage the session and to allocate an IP address to the terminal, and a user plane function (UPF) serves to forward user data under the control of the SMF.

Figure 10:
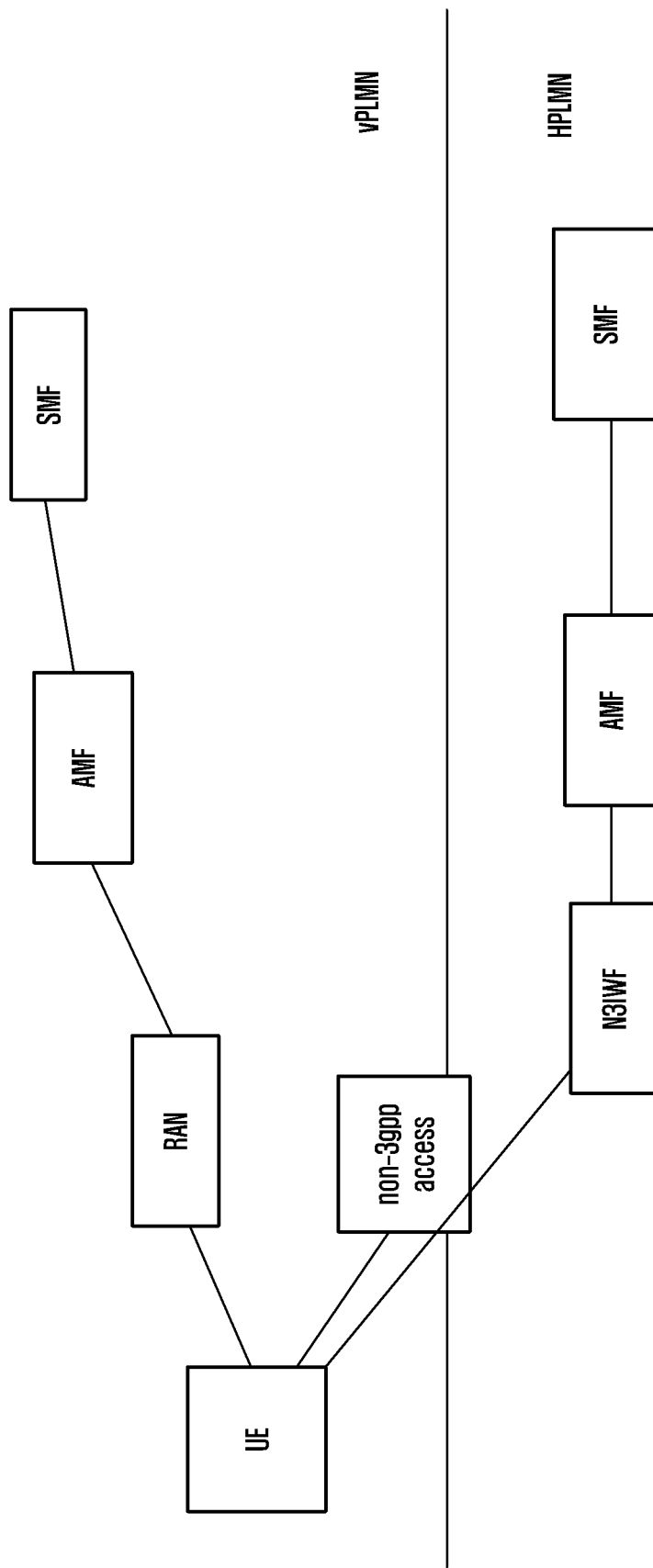
FIG. 10 illustrates a terminal accessing a 5G network of different PLMNs through a 3 gpp access and a non-3 gpp access according to an embodiment.

FIG. 10 is a diagram illustrating an example of a cellular network structure using different AMFs if a PLMN of a 3 gpp access is different from a PLMN of an N3IWF when a terminal performs an access through the 3 gpp access and a non-3 gpp access.

Referring to FIG. 10, if a terminal accesses a 5G core network through a 3 gpp access, that is, a 5G RAN, and simultaneously accesses the 5G core network through a non-3 gpp access, an N3IWF selected by the terminal for this may be in a PLMN that is different from the PLMN of the 3 gpp access, and different AMFs perform registration management with respect to the 3 gpp access and the non-3 gpp access. In this case, there is a possibility that traffic steering for the terminal or handover between the 3 gpp access and the non-3 gpp access is not supported.

As illustrated in FIGS. 9 and 10, a process in which the terminal selects the N3IWF through the non-3 gpp access during the network access may exert an influence on the registration management and the session management. For this, according to an embodiment of the present disclosure, a method for efficiently selecting the N3IWF will be described below. Although it is exemplified below that the non-3 gpp access is an untrusted non-3 gpp access in the present disclosure, it is apparent that the present disclosure can be applied even in case of accessing a 5G network through a trusted non-3 gpp access.

Figure 11:
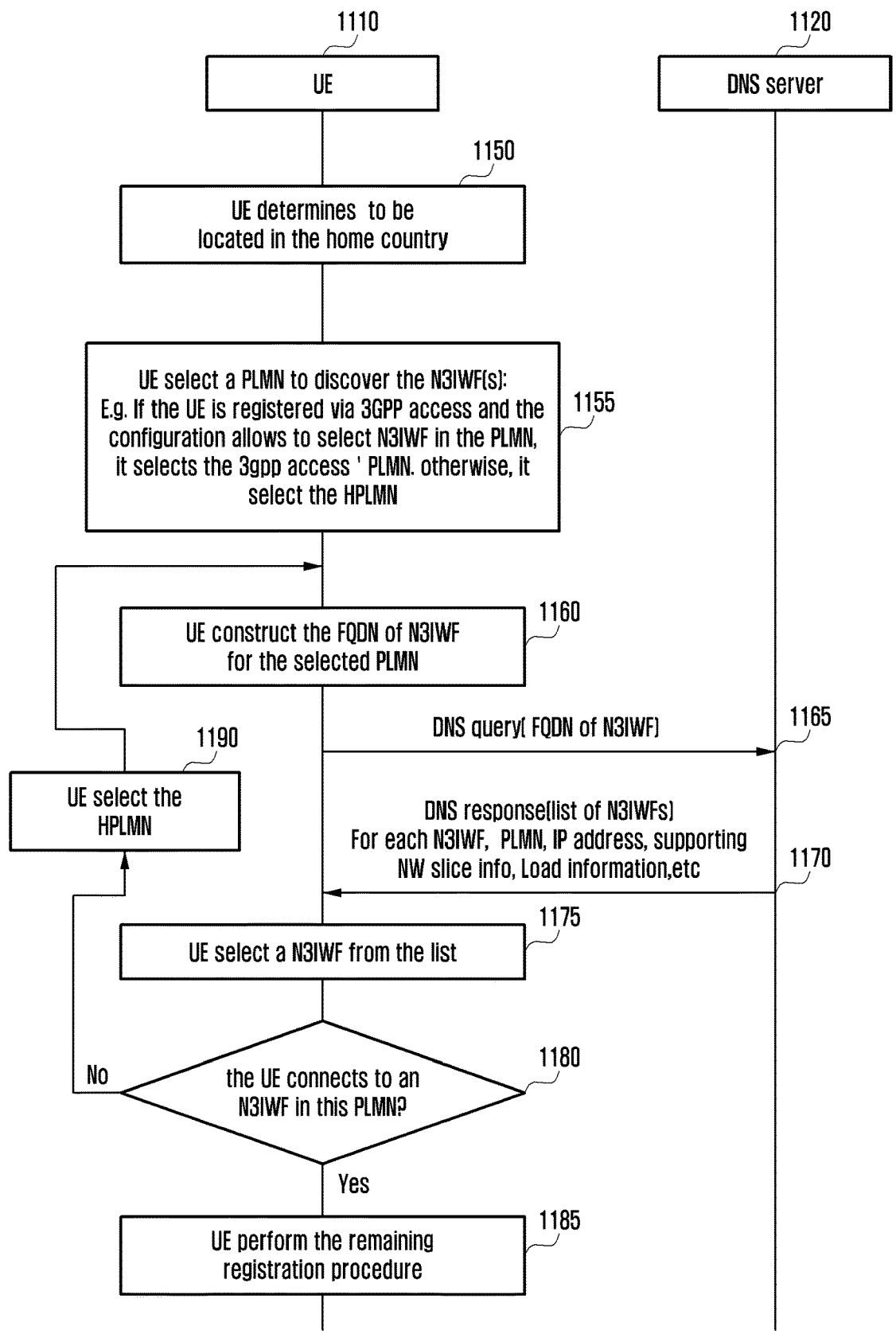
FIG. 11 is a signal flow diagram illustrating a process in which a terminal selects an N3IWF to access a 5G network through a non-3 gpp access, when the terminal is in a home country, according to an embodiment.

FIG. 11 is a signal flow diagram illustrating a process in which a terminal selects an N3IWF to access a 5G network through a non-3 gpp access, when the terminal is in a home country, according to an embodiment of the present disclosure.

Referring to FIG. 11, if a terminal (or UE) 1110 intends to access a 5G network through a non-3 gpp access, the terminal 1110 having acquired an IP connectivity selects the N3IWF to have an access to the 5G network, selects an AMF through the selected N3IWF, and makes registration in a network through a registration process.

For this, when selecting the N3IWF, the terminal 1110 determines its own location, e.g., the terminal 1110 can determine whether the terminal 1110 is in a home country or in a visited country through PLMN information of a network being accessed through the 3 gpp access, GPS information, or IP address information provided through the non-3 gpp access. Herein, a home country indicates a country to which a home public land mobile network (HPLMN) to which the terminal 1110 subscribes, belongs, i.e., an area corresponding to a mobile country code (MCC) of the HPLMN. Other areas are referred to as a visited country.

The terminal 1110 identifies that it is in the home country in operation 1150, and selects a PLMN in order to discover an N3IWF in operation 1155.

In this process, as an embodiment of the present disclosure, if the terminal 1110 is in the home country, it may select the HPLMN as the PLMN for discovering the N3IWF.

As another embodiment of the present disclosure, when the terminal 1110 is in the home country, it may select the PLMN for discovering the N3IWF in consideration that the terminal is registered through the 3 gpp access. That is, if the terminal 1110 is not registered through the 3 gpp access, it may select the HPLMN as the PLMN to discover the N3IWF. However, if the terminal 1110 is configured to select in the same PLMN with respect to the 3 gpp access and the non-3 gpp access, and the PLMN of the 3 gpp access is included in N3IWF selection information when the terminal 1110 is registered through the 3 gpp access, the terminal 1110 may select the PLMN being accessed through the 3 gpp access as the PLMN to discover the N3IWF. However, if the terminal 1110 is not configured to select in the same PLMN with respect to the 3 gpp access and the non-3 gpp access, or the PLMN of the 3 gpp access is not included in the N3IWF selection information, the terminal 1110 may select the HPLMN.

The configuration for the terminal to select the same PLMN with respect to the 3 gpp access and the non-3 gpp access may be included in a UE policy received from the HPLMN or may be directly configured in the terminal 1110. The UE policy may be included, e.g., in the N3IWF selection information, and it may include an indication of whether there is a roaming agreement permitting registration through the non-3 gpp access for roaming with respect to respective PLMNs included in the N3IWF selection information.

Further, the UE policy may include an indication of whether the terminal 1110 can select the PLMN of the 3 gpp access with respect to the registration for the non-3 gpp access in the home country.

Accordingly, the roaming agreement permits the registration through the non-3 gpp access with respect to the PLMN accessed by the terminal 1110 through the 3 gpp access, or if the terminal 1110 is configured to select the PLMN of the 3 gpp access with respect to the registration for the non-3 gpp access in the home country, the terminal 1110 may select the PLMN accessed through the 3 gpp access as the PLMN to discover the N3IWF. Otherwise, the terminal 1110 may select the HPLMN as the PLMN to discover the N3IWF. Of course, if the PLMN accessed through the 3 gpp access is the HPLMN, the terminal 1110 selects the HPLMN as the PLMN to discover the N3IWF.

If the terminal 1110 is unable to discover the N3IWF, even in the HPLMN, it cannot proceed with the N3IWF any further, and does not support the 5G network connection through the non-3 gpp access.

On the other hand, if the PLMN to discover the N3IWF is selected in the above-described process, the terminal 1110 configures a fully qualified domain name (FQDN) for the N3IWF in the selected PLMN (operation 1160). If there is an IP address of the N3IWF or the FQDN in the N3IWF identifier configuration in a state where the selected PLMN is the HPLMN, the terminal selects the N3IWF using this. If there is network slice information, e.g., S-NSAI information, supported by the respective N3IWFs in the N3IWF identifier configuration, the terminal 1110 selects the N3IWF using the IP address of the N3IWF or the FQDN coinciding with the network slice that the terminal intends to use.

If the selected PLMN is not the HPLMN, but is included in the N3IWF selection information, the terminal 1110 identifies whether the FQDN to be used in the selected PLMN is a tracking area identity (TAI) FQDN or an operator identifier FQDN. If the TAI FQDN is to be used, the terminal 1110 configures the FQDN of the N3IWF including the TAI information of the 3 gpp access based on the location of the terminal 1110. In this case, if the terminal 1110 cannot acquire the TAI information, it configures the operator identifier, which is the FQDN of the N3IWF including the PLMN information, or MCC and mobile network code (MNC) information.

The terminal 1110 sends a DNS query to a DNS server 1120 based on the configured FQDN (operation 1165), and receives a DNS response including a list of the N3IWFs for the corresponding FQDN (operation 1170).

The list of the N3IWFs included in the DNS response includes all or part of the PLMN information to which the respective N3IWFs belong, TAI information, IP address information of the N3IWF, network slice information (e.g., S-NSSAI information) supported by the N3IWF, and load information on the N3IWF.

The terminal 1110 selects a suitable N3IWF from the N3IWF list received from the DNS response using the network slice intended to be serviced by the terminal itself, N3IWF load information, and TAI or PLMN information (operation 1175).

On the other hand, the network slice information supported by the N3IWF indicates information on network slice(s) supported by the AMF or AMF group connected to the N3IWF.

The terminal 1110 having selected the N3IWF in operation 1175 performs connection setup with the corresponding N3IWF, and in this case, if the connection setup has failed, selects another N3IWF through operation 1175. However, if connection setup for all the N3IWFs has failed in the selected PLMN (operation 1180), the terminal 1110 selects again the HPLMN (operation 1190), and performs operation 1160 and subsequent operations.

As another embodiment of the present disclosure, if the connection setup with the N3IWF accessed by the terminal 1110 has failed, the corresponding N3IWF selects another suitable N3IWF in the same network, and transfers IP address information of the corresponding N3IWF, ID information of the N3IWF, or location information of the N3IWF to the terminal 1110 to make the terminal 1110 select the corresponding N3IWF.

In contrast, if the connection setup with the N3IWF has succeeded, the terminal 1110 performs the remaining registration procedure (operation 1185).

Figure 12:
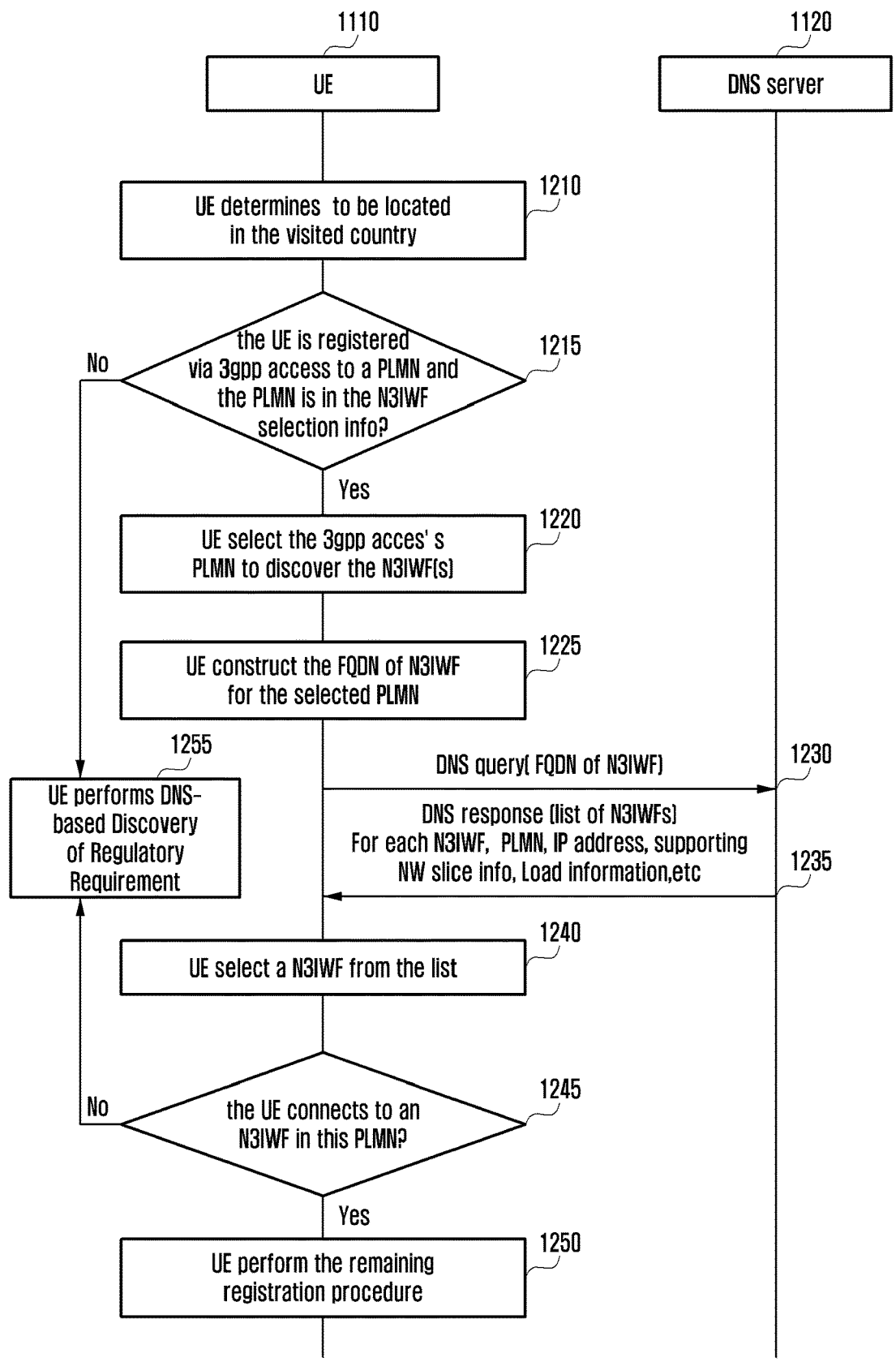
FIG. 12 is a signal flow diagram illustrating a process in which a terminal selects an N3IWF to access a 5G network through a non-3 gpp access, when the terminal is in a visited country, according to an embodiment.

FIG. 12 is a signal flow diagram illustrating a process in which a terminal selects an N3IWF to access a 5G network through a non-3 gpp access, when the terminal is in a visited country, according to an embodiment.

Referring to FIG. 12, if a terminal (or UE) 1110 intends to access a 5G network through a non-3 gpp access, the terminal 1110 having acquired an IP connectivity selects the N3IWF to have an access to the 5G network, selects an AMF through the selected N3IWF, and makes registration in a network through a registration process.

For this, in the process of selecting the N3IWF, the terminal 1110 grasps its own location, and for example, the terminal 1110 can grasp whether the terminal 1110 is in a home country or in a visited country through PLMN information of a network being accessed through the 3 gpp access, GPS information, or IP address information provided through the non-3 gpp access. Here, the home country means a country to which an HPLMN to which the terminal 1110 subscribes belongs, that is, an area corresponding to a mobile country code (MCC) of the HPLMN, and other areas are called a visited country.

If it is determined that the terminal 1110 is in the visited country as in operation 1210, the terminal 1110 determines a condition that whether the terminal itself is registered through the 3 gpp access, and whether the PLMN accessed through the 3 gpp is included in N3IWF selection information (operation 1215). If either of the above-described conditions is not satisfied, the terminal 1110 performs a DNS-based discovery of regularity requirement process (operation 1255). The DNS-based discovery of regularity requirement process selects the N3IWF in the same manner as an ePDG selection procedure of 3 gpp TS23.402.

However, if both the above-described conditions are satisfied, the terminal 1110 selects the PLMN of the 3 gpp access as the PLMN to discover the N3IWF (operation 1220), and configures the FQDN for the N3IWF in the selected PLMN (operation 1225).

That is, the terminal 1110 identifies whether the FQDN to be used in the selected PLMN is a TAI FQDN or an operator identifier FQDN. If the TAI FQDN is to be used, the terminal 1110 configures the FQDN of the N3IWF including the TAI information of the 3 gpp access based on the location of the terminal 1110. If the terminal 1110 cannot acquire the TAI information, it configures the operator identifier, which is the FQDN of the N3IWF including the PLMN information, or MCC and MNC information.

The terminal 1110 sends a DNS query to a DNS server 1120 based on the configured FQDN in operation 1230, and receives a DNS response including a list of N3IWFs for the corresponding FQDN in operation 1235.

The list of the N3IWFs included in the DNS response includes all or part of the PLMN information to which the respective N3IWFs belong, TAI information, IP address information of the N3IWF, network slice information (e.g., S-NSSAI information) supported by the N3IWF, and load information on the N3IWF.

In operation 1240, the terminal 1110 selects a suitable N3IWF from the N3IWF list received from the DNS response using the network slice intended to be serviced by the terminal, N3IWF load information, and TAI or PLMN information. On the other hand, the network slice information supported by the N3IWF indicates information on network slice(s) supported by the AMF or AMF group connected to the N3IWF.

The terminal 1110 having selected the N3IWF in operation 1240 performs connection setup with the corresponding N3IWF, and in this case, if the connection setup has failed, it selects another N3IWF through operation 1240. However, if connection setup for all the N3IWFs has failed in the selected PLMN (operation 1245), the terminal 1110 performs operation 1255 to select another PLMN.

As another embodiment of the present disclosure, if the connection setup with the N3IWF accessed by the terminal 1110 has failed, the corresponding N3IWF selects another suitable N3IWF in the same network, and transfers IP address information of the corresponding N3IWF, ID information of the N3IWF, or location information of the N3IWF to the terminal 1110 to make the terminal 1110 select the corresponding N3IWF.

In contrast, if the connection setup with the N3IWF has succeeded, the terminal 1110 performs the remaining registration procedure (operation 1250).

Figure 13:
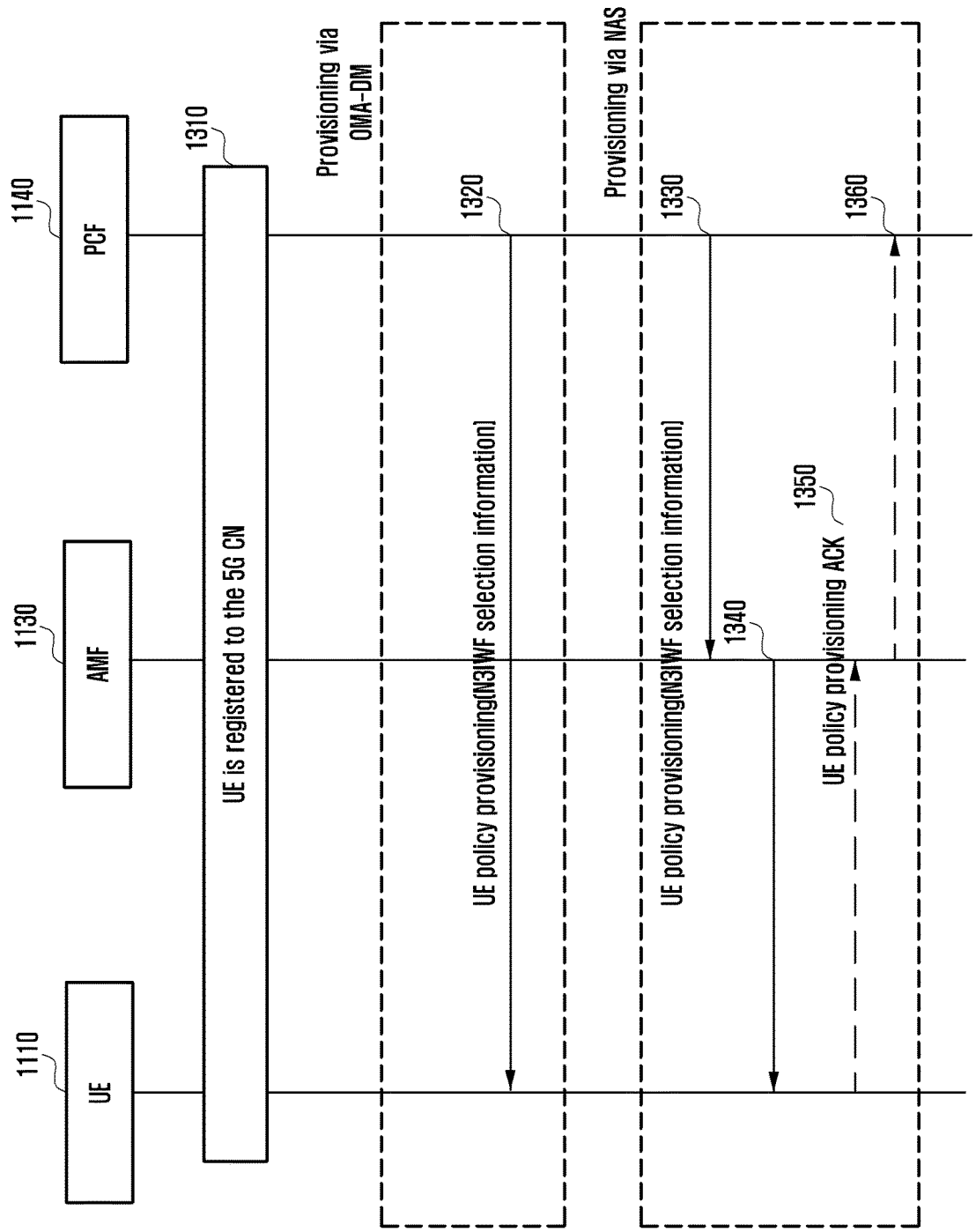
FIG. 13 is a signal flow diagram illustrating a process of transferring UE configuration information to a terminal according to an embodiment.

FIG. 13 is a signal flow diagram illustrating a process of transferring UE configuration information, such as N3IWF selection information, to a terminal according to an embodiment of the present disclosure.

Referring to FIG. 13, the terminal 1110 stores UE configuration information, such as N3IWF selection information, and uses the stored information in an N3IWF selection process, e.g., as in the embodiments described with reference to FIGS. 11 and 12 above.

The UE configuration information may be stored in a USIM of the terminal 1110, may be configured by a user in the terminal 1110, or may be transferred from the network when the terminal 1110 is accessing or has accessed the 5G network in operation 1310. For example, a policy control function (PCF) 1140 may directly transfer configuration information of the corresponding UE to the terminal 1110 through Open Mobile Alliance Device Management (OMA-DM), and for example, through home access network discovery and selection function (H-ANDSF) in operation 1320. Further, if the PCF 1140 transfers the UE configuration information to the AMF 1130, the AMF 1130 may transfer the UE configuration information received through a NAS message to the terminal 1110 (operations 1130 and 1140). Further, the terminal may transmit a response (UE policy provisioning ACK) to the AMF 1130, and the AMF 1130 may transmit the response to the PCF 1140 (operations 1350 and 1360).

On the other hand, in an embodiment of the present disclosure, the UE configuration information, such as the N3IWF selection information, may include following information.

UE Configuration (e.g. N3IWF Selection Information)

Preferred PLMN list (ordered);
For each PLMN, indication on whether TAI FQDN is supportive or not);
For each PLMN, indication on whether there is a roaming agreement on registration via non-3GPP access;
Indication on whether UE select PLMN of 3GPP access or not in home country.

Accordingly, in the embodiments as described above with reference to FIGS. 11 and 12, the N3IWF selection information may be used, and the information may also be included in subscription information of the terminal.

In the embodiments of the present disclosure as described above, constituent elements included in the present disclosure are expressed in a singular form or in a plural form.

However, such a singular or plural expression is selected to suit a situation presented for convenience in explanation, and thus the present disclosure is not limited to such singular or plural constituent elements. Even plural constituent elements may be expressed in a singular form, and even a single constituent element may be expressed in a plural form.

On the other hand, although detailed embodiments of the present disclosure have been described in the specification and drawings, it will be apparent that various modifications are possible within the scope of the present disclosure. Accordingly, the scope of the present disclosure should not be limited to the embodiments as described above, but should be defined by the appended claims below and those equivalent to the scope of the claims.

Embodiment 3

In describing embodiments of the present disclosure in detail, although a radio connection network in which 5G network standards are determined by 3GPP, a new RAN (NR) that is a core network, and a packet core (5G system, 5G core network, or next-generation core (NG Core)) will be the main subject, the primary gist of the present disclosure can also be applied to other communication systems having similar technical backgrounds through slight modifications thereof in a range that does not greatly deviate from the scope of the present disclosure by the judgment of those skilled in the art to which the present disclosure pertains.

Hereinafter, for convenience in explanation, terms and titles defined in the $3^{rd}$ generation partnership project long term evolution (3GPP) standards may be partially used. However, the present disclosure is not limited to such terms and titles, but may also be applied to systems following other standards in the same manner.

In 5G mobile communication services defined in 3GPP, there are functions providing optimized services based on the location of a terminal. For example, if a traffic path is corrected to a UPF close to an area in which the terminal is located, the terminal can send and receive data at higher speeds. As another example, in order to support mobile edge communications, a terminal in a specific area may be made to access a specific UPF and an AS to use services.

For this, the 3GPP supports the following functions.
Function of identifying location information of a terminal in a core network
Function of notifying an AS of location information of a terminal in a core network Based on these functions, an application server (AS) (or application function (AF)) may perform following functions.
Function in which an AS establishes or changes a session of a terminal to use a UPF close to the location of the terminal through triggering
Function in which an AS changes a QoS used in case of using a UPF close to the location of the terminal through triggering
Function of requesting billing policy change according to the current location of the terminal
Function of activating a local data network usable according to the current location of the terminal The above-described functions are activated when the AS determines a specific condition and sends a corresponding request to a core network. This means that combinations of the above-described functions are performed through individual transactions for respective events. If the AS repeatedly performs the above-described session establishment, session change, QoS change, billing change, and local data network activation in the core network with respect to the same condition, this may cause an inefficient signaling.

The present disclosure proposes that the AS configures conditions for specific events and corresponding operation lists to a PCF or network exposure function (NEF), and executes an operation for a configured event after the PCF/NEF detects a specific event of the terminal. Accordingly, it is not necessary for the AS to repeatedly trigger a new function through reception of a notification for the event of the terminal. Because the AS configures a specific event combination of the terminal and the corresponding operation list to the core network, the core network itself can perform the operation to match the event of the terminal, and then notify the AS of this.

Explanation of entities appearing in the present disclosure is as follows.

A terminal (UE) is connected to a radio access network (RAN) and accesses a device that performs a mobility management function of a 5G core network device. In the present disclosure, this is called an access and mobility management function (AMF). This may call a function or a device taking charge of an access of the RAN and the mobility management of the terminal in all. The AMF serves to route a terminal session related message to a session management function (SMF). The AMF is connected to the SMF, and the SMF is connected to a user plane function (UPF) and establishes a tunnel for transmitting data between a base station and the UPF through allocation of a user plane resource to be provided to the terminal. In the present disclosure, the calling of the AMF may mean a core network device providing mobility management for the terminal, that is, a device receiving a NAS message of the terminal having a different title. For convenience, in the present disclosure, it is called the access mobility management function (AMF).

NEF is an abbreviation of a network exposure function, and serves to connect a 3GPP core network device to an external device.

PCF is a core network device serving to manage and apply policy, and can perform enforcement to apply the policy or rule for the session used by the terminal.

AF is an abbreviation of an application function, and may means an application related function located inside a 3 gpp network or an application server (AS) located outside the 3 gpp network.

First Embodiment

Figure 14:
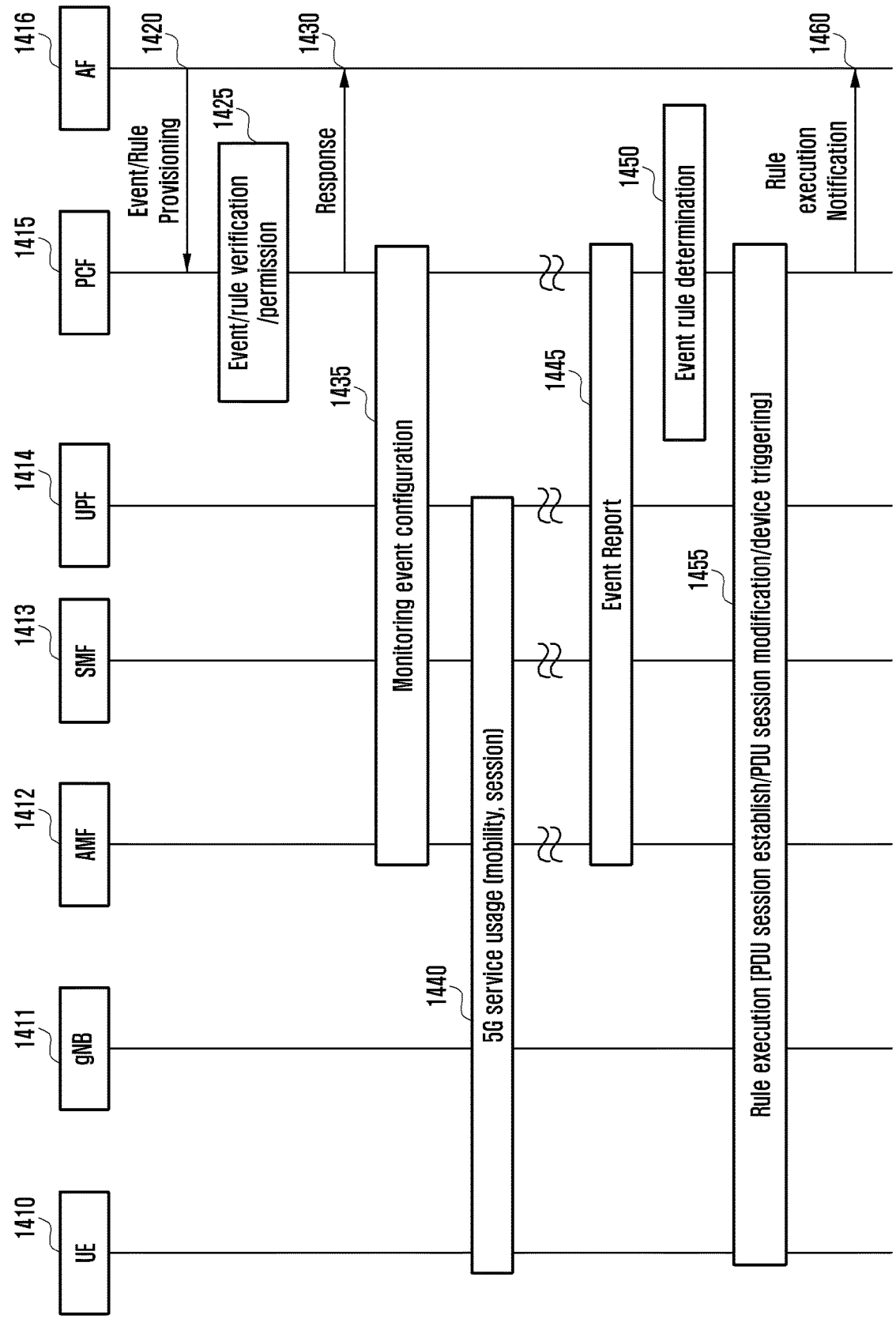
FIG. 14 is a signal flow diagram illustrating a procedure in which an AF provides an event and a rule through a PCF, and the PCF applies them to match the event of a terminal, according to an embodiment.

FIG. 14 is a signal flow diagram illustrating a procedure in which an AF provides an event and a rule through a PCF, and the PCF applies them to match the event of a terminal, according to an embodiment.

Referring to FIG. 14, an AF 1416 may send a request to the 3GPP network to provide, to a terminal 1410, a mobile edge communication (MEC) service, a data network usable only in a specific location, or a non-billing service provided in the specific location.

In an embodiment of the present disclosure, the AF 1416 may configure a certain condition or an event that can be identified by the terminal 1410 in the 3GPP network. The event condition (per UE) may configure the following items:
UE location and accuracy (e.g., a Cell ID, a gNB ID, a TAI, geographical information, or an MCC);
data network name (DNN) and NSSAI;
Application ID; and
target IP address and port number.

The UE location indicates location information of the terminal 1410 that can be identified in the 3GPP network.

The accuracy indicates granularity for the corresponding location information. Accordingly, the UE location may be determined in the 3GPP network as a cell ID unit, a base station (gNB) ID unit, a TAI unit, specific GPS information, or specific country code information (e.g., MCC). The AF 1416 requests location information of the terminal 1410, e.g., ID #1, and the inscription of corresponding granularity that is the cell ID or gNB ID. Accordingly, the 3GPP network can identify what ID of what granularity the location information condition of the terminal 1410 sent by the AF 1416 corresponds to. Specifically, if the AF 1416 requests the location of the terminal 1410 as GPS information and requests the location information of the terminal 1410 as specific granularity, the 3GPP core network device (PCF 1415 or NEF 1418) determines the cell ID, base station ID, or TAI corresponding to the specific GPS information by mapping and stores it.

DNN is a data network name, and calls a packet data network accessed by the terminal 1410. Because the terminal 1410 establishes a PDU session in a specific DNN, the AF 1416 may configure what DNN the terminal 1410 uses as a condition or an event. Accordingly, the AF 1416 may also configure what is the DNN used by the terminal 1410 as a condition or an event. Similarly, the NSSAI may configure the network slice information used by the terminal 1410 as a condition of an event.

App. ID means an application ID used by the terminal 1410. This is used in the form of an App ID for the operating system (OS) used by the terminal 1410, e.g., in the form of an OS-App-ID. The AF 1416 may configure the App ID used by the terminal 1410 as a condition or an event, and may request the terminal 1410 to perform a certain operation when the terminal 1410 uses the PDU session using a certain App ID.

The target IP address and the port number indicate an address of the application server accessed and used by the terminal 1410 and the port number. The AF 1416 may route a service being provided to the terminal 1410 to a specific server, and in this case, the terminal 1410 sends uplink data through allocation of the corresponding target IP address and IP port as the destination IP address and port. Because the 3GPP network can determine what condition is satisfied or what event occurs by identifying the destination IP address and port of data sent by the terminal 1410, the AF 1416 configures this as the condition or event.

In accordance with an embodiment of the present disclosure, if a specific terminal 1410 satisfies a certain condition or an event that can be identified in the 3GPP network, the AF 1416 may configure an operation to be performed in the 3GPP network with respect to the terminal 1410. Herein, operations that can be performed in the 3GPP core network according to a specific condition are referred to as "rules." However, the names are not limited thereto, and other names meaning the operations performed in the 3GPP network may be included. The AF 1416 may configure a rule profile through a set of rules, and may configure the following items.

rule profile
data network access identifier (DNAI): identify local UPF
Local DNN: Used during generation of a PDU session leading to local
QoS value, charging profile
uplink classifier (ULCL)

The DNAI is an identifier identifying a local UPF located in a specific area. Accordingly, if a certain condition is satisfied, it means an operation to steer the session of the terminal 1410 to the corresponding local UPF.

The local DNN indicates a local data network located in a specific area, and the terminal 1410 may generate and use a new PDU session as the corresponding DNN. Accordingly, when the terminal 1410 is located in a certain location, it means an operation triggering an access of the terminal 1410 to a certain local DNN. When the terminal 1410 is located in a corresponding area, it receives information on the usable local DNN, and uses a data service through requesting of the PDU session for the received information.

The QoS value represents a QoS of a session used by the terminal 1410. The terminal uses the value as the QoS value to be applied to the session when traffic is steered into a local UPF located in a specific area. That is, the QoS value indicates the QoS value to be applied to the steered session. Further, the QoS value may be a QoS profile for the corresponding local DNN when the terminal 1410 uses the local DNN.

The charging profile represents billing information that is applied when the corresponding UPF traffic is steered. If a path of a session of the terminal 1410 is changed to a UPF of a specific area, the charging profile may include information to record whether the service is used free or at higher rates, or how long the terminal 1410 uses the local UPF. Further, the charging profile may be billing information for the corresponding local DNN when the terminal 1410 uses the local DNN.

The ULCL is a classifier for passing the traffic sent by the terminal 1410 to the local DN. Accordingly, if the terminal 1410 moves to a determined location, it means an operation to pass the traffic of the terminal 1410 to the local DN by applying a determined ULCL.

In accordance with an embodiment of the present disclosure, the AF 1416 may configure information on the condition/event and the corresponding operation/rule in a list to be transferred to the PCF 1415 or NEF 1418. For example, if the terminal 1410 uses a specific DNN and NSSAI when it moves to Seoul—Daejeon—Daegu—Pusan, information on what DNAI is used in Seoul, what DNAI is used in Daejeon, what QoS value is applied, and how the bill is made is configured in a list.

Accordingly, with respect to the services that the corresponding AF 1416 provides to the terminal 1410, it is not necessary for the AF 1416 to identify the location of the terminal 1410 every time, in order to determine how to provide the service, and to request this from the 3GPP core network, but the AF 1416 requests all conditions and events for services for each area that can be provided by the AF itself and corresponding operations of the 3GPP core network. Accordingly, the time required for "event discover—operation request—operation performing" in order to provide an MEC service to the terminal 1410 can be reduced, and interaction between the 3GPP core network and the AF 1416 can be reduced.

FIG. 14 illustrates a procedure in which an AF provides an event and a rule through a PCF, and the PCF applies them to match the event of a terminal.

FIG. 14 illustrates a method in which the AF 1416 provisions an event and a rule for the terminal 1410 to the PCF 1415, and if the corresponding event is discovered, the PCF 1415 applies the corresponding rule and transfers a corresponding notification to the AF 1416. The AF 1416 provides the event and the rule as in the above-described embodiment to the PCF 1415 (operation 1420). The PCF 1415 verifies whether the specific terminal 1410 can use them and whether the AF 1416 requests them, determines whether the AF 1416 provides monitoring for the event requested by the AF 1416, and determines the rule that can be supported among the rules requested by the AF 1416 (operation 1425). The PCF 1415 sends a response to the AF 1416 with respect to the determined event and rule to confirm performing of the corresponding request (operation 1430).

The PCF 1415 configures a monitoring event to respective core network devices, such as AMF 1412, SMF 1413, and UPF 1414, in accordance with the requested event. For example, monitoring for the location of the terminal 1410 is configured to the AMF 1412, monitoring for a DNN used by the terminal 1410 is configured to the SMF 1413, and monitoring for a target IP address to which the terminal 1410 sends data is configured to the UPF 1414. The PCF 1415 can monitor the App ID used by the terminal 1410. Further, the SMF 1413 can monitor the App ID used by the terminal 1410. This method is handled in another embodiment.

The terminal 1410 freely moves as using a data service and uses a session in 5G (operation 1440). In this case, if a specific event is detected by the AMF 1412, SMF 1413, and UPF 1414, the corresponding devices notify the PCF 1415 of the result of the monitoring (operation 1445).

The PCF 1415 determines a rule for the detected event (operation 1450). This is requested by the AF 1416 from the PCF 1415, and is based on event and rule lists permitted by the PCF 1415.

The PCF 1415 performs PDU session generation, correction, or device triggering based on the determined rule (operation 1455). For example, if it is necessary for the terminal 1410 to access a specific local DN, the PCF may guide PDU session generation by device-triggering the terminal, whereas if the terminal 1410 should change the traffic path to a specific local UPF, the PCF may request PDU session correction to the SMF 1413. Further, if the terminal 1410 requests the PDU session generation from a specific local DN in a specific location, the PCF may apply a certain QoS or charging.

The PCF 1415 having performed the specific rule may notify the AF 1416 of the result of the rule performance (operation 1460).

The operation in which the PCF 1415 performs subscription of the event will be described in more detail. If a spatial condition (e.g., spatial condition on which traffic steering rule is executed when the terminal 1410 is located in a specific location) requested by the AF 1416 is received, the PCF 1415 may perform one of the following operations.

1) Method by the PCF 1415 for directly grasping the spatial condition (location condition): It is necessary for the PCF 1415 to grasp the current location of the terminal 1410 to apply the traffic steering rule requested by the AF 1416 in accordance with the current location of the terminal 1410, that is, to steer the traffic of the terminal to a specific DNAI. Accordingly, the PCF 1415 may subscribe to the event on the location information of the terminal 1410 from the AMF 1412 or SMF 1413.

If the PCF 1415 subscribes to the location monitoring event of the terminal 1410 from the AMF 1412, the PCF 1415 may receive the event result for all location changes of the terminal 1410 regardless of the session actually used by the terminal 1410. Further, the PCF 1415 may determine whether the AF 1416 coincides with the spatial condition (or location condition) requested by the AF 1416 based on the location of the terminal 1410 that is in the received event result, and then may provide the traffic steering rule to the SMF 1413 serving the corresponding terminal 1410.

As another embodiment, the PCF 1415 may subscribe to the event for the location information of the terminal 1410 from the SMF 1413. The SMF 1413 is the SMF providing the PDU session to the terminal 1410, and the PDU session is a PDU session to which the traffic steering requested by the AF 1416 should be applied. Because the event result for the location information change of the terminal 1410 transmitted by the corresponding SMF 1413 corresponds to the location change of the corresponding terminal 1410 while the terminal uses the PDU session for the traffic steering, it is certain that the event is the event that should be applied to the traffic steering. Accordingly, as compared with a case where the PCF 1415 receives a report of the location event from the AMF 1412, a case where the PCF 1415 receives a report of the location event from the SMF 1413 corresponds to reception of more certain signaling, and thus unnecessary location event notification of the terminal 1410 can be reduced. When the PCF 1415 performs event subscription from the SMF 1413, the PCF 1415 can perform subscription of the event for the spatial condition (or location condition) requested by the AF 1416. More specifically, the PCF 1415 may convert the location (or geographic information) for the location condition requested by the AF 1416 into 3 gpp level information (e.g., a cell ID, a base station ID, a tracking area ID, etc.), and may perform subscription of the event for the converted location to the SMF 1413. In this case, the PCF 1415 may configure the location information of the 3 gpp level mapped on the location condition requested by the AF 1416 in a list to subscribe to the SMF 1413. Accordingly, when the terminal 1410 is located in the corresponding subscribed area, the PCF 1415 may configure the SMF 1413 to transmit the event reporting.

Further, when the terminal 1410 moves out of the subscribed area, the PCF 1415 may configure the SMF 1413 to transmit the event reporting.

When the SMF 1413 is aware of a location change of the terminal 1410 with respect to the event subscribed by the PCF 1415, the SMF 1413 may notify the PCF 1415 of the location information of the corresponding terminal 1410 through an event notification. The SMF 1413 may receive the location change of the terminal 1410 from the AMF 1412 through the event notification, or may determine the location change of the terminal 1410 in view of the location of the terminal 1410 included in a session management message sent by the 5G base station 1411.

Further, the AMF 1412 may include the location information of the terminal 1410 in an N11 interface message including the session management message transferred from the 5G base station 1411 in order to send the N11 interface message, and the SMF 1413 may receive the N11 interface message and identify the location information of the terminal 1410.

If the PCF 1415 requests an event for a specific location list, i.e., if the PCF 1415 configures location information for the DNAI in a list or configures location information for the spatial condition requested by the AF 1416 in a list to perform event subscription to the SMF 1413, the event notification may be sent to the PCF 1415 when the location change of the terminal 1410 is identified with respect to the requested location list. More specifically, the event notification may be sent when the terminal 1410 is located in the requested location or when the terminal 1410 gets out of the requested location list. Further, the event notification may be sent when the terminal 1410 gets out of the location for one DNAI or when the location of the terminal 1410 is changed within the requested location. If the event notification is received, the PCF 1415 may determine what traffic steering is applied to the current location of the corresponding terminal 1410, and may steer the PDU session path of the terminal 1410 by updating the traffic steering rule or providing the traffic steering rule to the SMF 1413.

2) Method by the PCF 1415 for transferring all spatial conditions to the SMF 1413: The PCF 1415 may provide information on a spatial condition (or location condition) requested by the AF 1416 to a portion of the traffic steering rule or a policy changing control (PCC) rule transferred to the SMF 1413, instead of performing event subscription to the SMF 1413. More specifically, the PCF 1415 may convert the location information (or geographic information) for the location condition requested by the AF 1416 into 3 gpp level information (e.g., a cell ID, a base station ID, a tracking area ID, etc.), and may configure and transfer a list for the changed locations to the SMF 1413 as a part of the traffic steering rule or a part of the PCC rule. Accordingly, if the terminal 1410 is located in the corresponding area, the traffic steering rule to match the same can be applied.

In other words, If the PCF 1415 transfers the location condition to the SMF 1413 together with the traffic steering rule, the SMF 1413 may determine that the corresponding terminal 1410 is located in a specific area (e.g., a cell ID, a base station ID, or a tracking area ID), and then may steer the PDU session of the terminal 1410 to a local access identified by the DNAI in accordance with the traffic steering rule corresponding to the corresponding location condition. Methods by the SMF 1413 for determining the location of the terminal 1410 may include methods for performing event subscription to the SMF 1412, for viewing the location of the terminal 1410 included in the SM message sent by the base station 1411, and for identifying the location of the terminal 1410 when the AMF 1412 includes the location of the terminal 1410 in the N11 message including the SM message sent by the base station 1411 to be sent. If the current location of the terminal 1410 meets the location condition for the traffic steering and there is a traffic steering rule for the corresponding condition, based on the information transferred from the PCF 1415, the SMF 1413 may perform a PDU session modification procedure to execute the corresponding rule. As another example, the SMF 1413 may designate a specific location list transferred from the PCF 1415 as an area of interest, and may perform subscription of the event for the area of interest to the AMF 1412. In this case, the SMF may receive an event notification from the AMF 1412 with respect to the subscribed location list, and if the location change of the terminal 1410 is identified, it may determine to apply the traffic steering rule transferred from the PCF 1415. More specifically, the SMF 1413 may designate specific location information for one DNAI or the location information list as the area of interest, and may perform subscription of the corresponding event to the AMF 1412. In this case, if the terminal 1410 moves to a location corresponding to the area of interest or moves out of the corresponding location, the AMF 1412 may notify the SMF 1413 of the location of the terminal 1410, and the SMF 1413 may select a new DNAI based on this or may rearrange the UPF 1414. As another detailed example, the SMF 1413 may designate the location information list for the DNAI list of the SMF itself as the area of interest, and may perform event subscription to the AMF 1412. This is to designate the area of interest having a wider range than that of the above-described example, and the SMF 1412 notifies the SMF 1413 of the location change of the terminal 1410 moving in the requested area of interest, and makes a notification when the terminal 1410 gets out of or enters into the area of interest. Accordingly, if the terminal 1410 moves as continuously changing the location thereof outside the area of interest, the AMF 1412 may not send the event notification to the SMF 1413 (this is because the location change of the terminal outside the area of interest does not exert an influence on the determination operation of the SMF 1413).

3) Method by the PCF 1415 for transferring a DNAI list to the SMF 1413 in consideration of an SMF serving area and transferring a spatial condition to match the same: The PCF 1415 may include the location condition for the SMF 1413 as a part of the traffic steering rule or a part of the PCC rule, and this may include only those related to the DNAI transferred to the SMF 1413. That is, the PCF 1415 may know, in advance, information on an area served by the SMF 1413 and the DNAI accessible by the SMF 1413 (this may follow the configuration information, may be received by the PCF 1415 through negotiation with a network repository function (NRF), or may be configured through an operations, administration, & maintenance (OA&M) device), and the PCF 1415 may transfer the location information for the corresponding DNAI to the SMF 1413 in association. For example, the PCF 1415 may configure the DNAI information and the location information or the location information list corresponding to the corresponding DNAI as 3 gpp level location information (e.g., a cell ID, a base station ID, and a tracking area ID) to be transferred to the SMF 1413. Further, the PCF 1415 may configure the corresponding location information or the location information list in association with respect to the traffic steering rule (rather than the location information corresponding to the DNAI), and may transfer the configured information to the SMF 1413. That is, the PCF 1415 may configure information on performing of a certain traffic steering rule when the terminal 1410 is located in a certain location. In this case, the PCF 1415 may configure the information in association with the location condition and an ID using the ID for the traffic steering rule. When the DNAI and the location information are associated with each other, or when the traffic steering rule and the location information are associated with each other, the PCF 1415 may associate the information in consideration of the spatial condition requested by the AF 1416. For example, if the AF 1416 requests to steer the traffic to a specific DNAI when the terminal 1410 enters into a specific location, the PCF 1415 may associate the DNAI and the location information indicating the corresponding spatial condition with each other, and may transfer the associated information to the SMF 1413. As another example, if the AF 1416 requests to apply a specific traffic steering rule when the terminal 1410 enters into a specific location, the PCF 1415 may associate the traffic steering rule (e.g., information identified as an ID) and the location information with each other, and may transfer the associated information to the SMF 1413. It is apparent that the above-described location information can be configured as a list to be transferred to the SMF 1413, and the location information of each list is identified as the location condition to determine a specific DNAI or a specific traffic steering rule. Accordingly, the SMF 1413 can identify what DNAI the traffic is steered to when the terminal 1410 moves to a certain location. As described above, the SMF 1413 having received "the DNAI and the location information indicating the corresponding location condition" or "the traffic steering rule and the location information indicating the corresponding location condition", in order to know that the corresponding terminal 1410 has moved to a specific location, may determine the location of the terminal 1410 by receiving the notification of the location information through subscription of the event to the AMF 1412, in view of the location information of the terminal 1410 included in the SM message sent by the base station 1411, or in view of the location information of an N11 message if the N11 message that the AMF 1412 sends to the SMF 1413 includes the SM message sent by the base station 1411 and the location information of the terminal 1410. After determining the location of the terminal 1410, the SMF 1413 discovers the corresponding traffic steering rule or the DNAI from the information transferred by the PCF 1415, and then may apply the corresponding traffic steering rule or steer the PDU session of the terminal 1410 to the corresponding DNAI. Accordingly, with respect to the location condition that the PCF itself provides to the SMF 1413, it is not necessary for the PCF 1415 to perform the location determination operation of the terminal 1410, but may apply the traffic steering through self-determination. If the terminal 1410 moves to a location excluding the condition allocated to the SMF itself, the SMF 1413 may include and notify the PCF 1415 of the location information of the terminal 1410 in order to request a policy update from the PCF 1415. The PCF 1415 having received this may update the traffic steering rule for the SMF 1413, or may perform an SMF change procedure.

If it is determined that the SMF 1413 for serving the PDU session of the corresponding terminal 1410 should be changed as the result of the operation 1), 2), or 3), the PCF 1415 may perform a PDU session release to the existing SMF, and may indicate a PDU session establishment to a new SMF. In this case, in accordance with the operation 1), 2), or 3), the PCF 1415 may retransmit all of the traffic steering rule and the corresponding location condition, or may configure and transfer the specific location condition in consideration of the SMF serving area.

Figure 15:
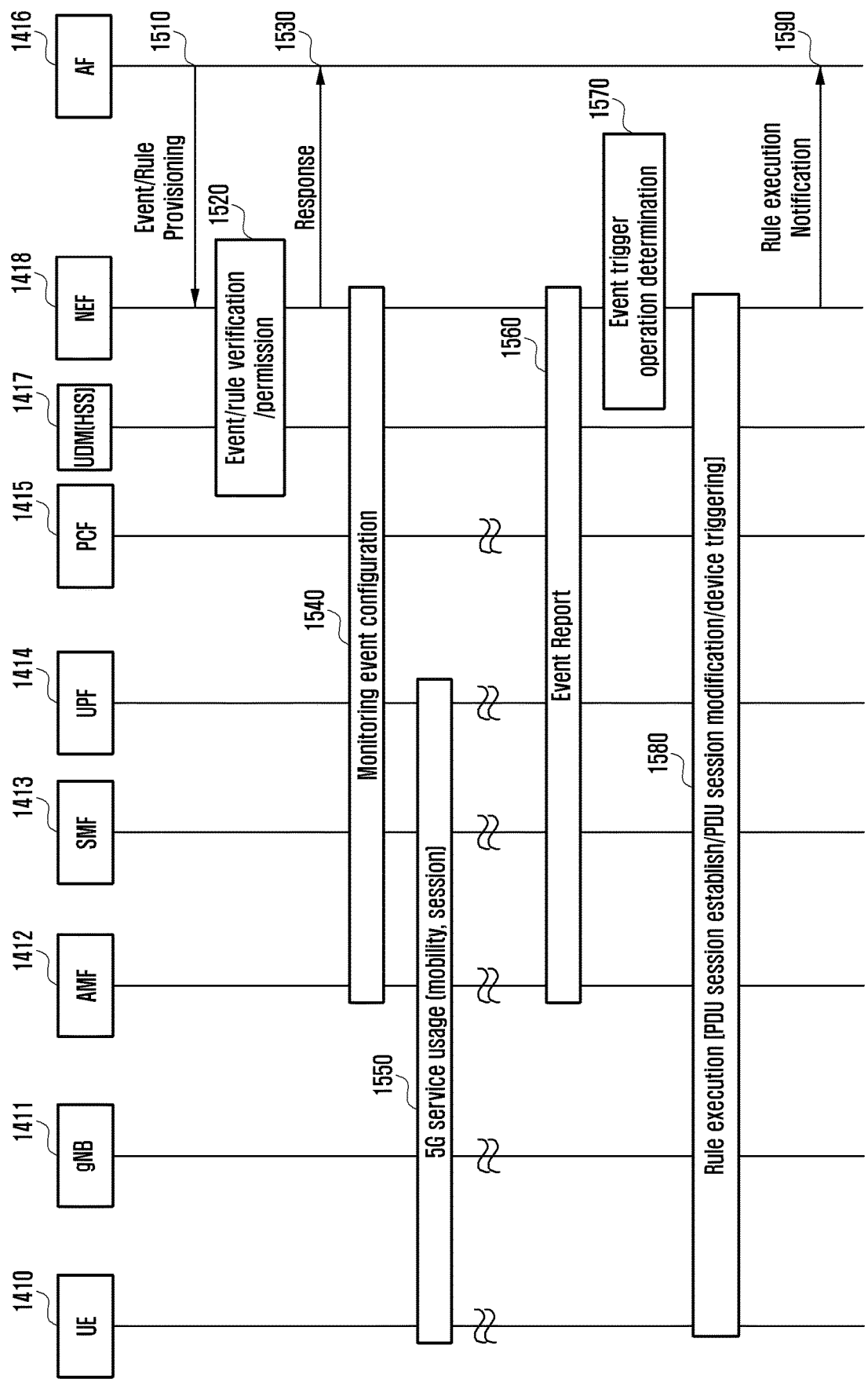
FIG. 15 is a signal flow diagram illustrating a procedure in which an AF provides an event and a rule through an NEF, and the NEF applies them to match the event of a terminal, according to an embodiment.

FIG. 15 is a signal flow diagram illustrating a procedure in which an AF provides an event and a rule through an NEF, and the NEF applies them to match the event of a terminal, according to an embodiment. FIG. 15 illustrates a method in which an NEF 1418 performs the operation as illustrated in FIG. 14 instead. The AF 1416 provides the event and the rule as in the above-described embodiment to the NEF 1418 (operation 1510). The NEF 1418 verifies whether this request can be applied with respect to the specific terminal 1410 through negotiation with a unified data management (UDM) 1417, verifies that the AF 1416 can request this, determines whether the AF 1416 provides monitoring for the event requested by the AF 1416, and determines the rule that can be supported among the rules requested by the AF 1416 (operation 1520). The NEF 1418 sends a response to the AF 1416 with respect to the determined event and rule to identify performing of the corresponding request (operation 1530). As a detailed embodiment, the NEF 1418 may perform the verification and permission procedure with the PCF 1415.

The NEF 1418 configures a monitoring event to respective core network devices, i.e., the AMF 1412, the SMF 1413, the UPF 1414, and the PCF 1415, in accordance with the requested event (operation 1540). For example, monitoring for the location of the terminal 1410 is configured to the AMF 1412, monitoring for a DNN used by the terminal 1410 is configured to the SMF 1413, and monitoring for a target IP address to which the terminal 1410 sends data is configured to the UPF 1414. The PCF 1415 can monitor the App ID used by the terminal 1410. Further, the SMF 1413 can monitor the App ID used by the terminal 1410. This method is handled in another embodiment.

The terminal 1410 freely moves while using a data service and uses a session in 5G (operation 1550). In this case, if a specific event is detected by the AMF 1412, SMF 1413, and/or UPF 1414, the corresponding device or devices notify the NEF 1418 of the result of the monitoring (operation 1560).

The NEF 1418 determines a rule for the detected event (operation 1570). This is requested by the AF 1416 from the NEF 1418, and is based on event and rule lists permitted by the NEF 1418.

The NEF 1418 views the determined rule based on the reported event, and requests the 3 gpp core network device to perform PDU session generation, correction, or device triggering (operation 1580). For example, if it is necessary for the terminal 1410 to access a specific local DN, the NEF 1418 may guide PDU session generation by device-triggering the terminal, whereas if the terminal 1410 should change the traffic path to a specific local UPF, the NEF 1418 may request PDU session correction from the PCF 1415 or SMF 1413. Further, if the terminal 1410 requests the PDU session generation from the specific local DN in a specific location, the NEF 1418 may request the PCF 1415 to apply a certain QoS or charging.

The NEF 1418 having performed the specific rule may notify the AF 1416 of the result of the rule performance (operation 1590).

As another embodiment of the present disclosure, a method by the PCF 1415 for acquiring App ID is as follows.

The UPF 1414 determines what an application for a destination IP and a port is through packet filter description or packet detection, and then notifies the SMF 1413 of this, and the SMF 1413 notifies the PCF 1415 of this.

During session generation, the terminal 1410 may include information on what App ID is used for the PDU session request, and the SMF 1413 having received this notifies the PCF 1415 of this.

If the AS performs mapping of an AS IP address+port number to the App ID to transfer the same to the PCF 1415, the PCF 1415 may identify what IP address and port number data is sent to in view of packets in the PDU session used by the terminal 1410, and then may determine what App ID data is sent to.

As another embodiment, a method by the PCF 1415 for acquiring UE location (as requested accuracy) is as follows.

The PCF 1415 requests event monitoring for the location of the terminal 1410 from the AMF 1412, and transfers accuracy information received from the AF 1416 together. The AMF 1412 identifies the location of the terminal 1410 based on the event monitoring request and corresponding accuracy (whether the level is a cell level, base station level, or TAI level), and transfers a report to the PCF 14151

If the PCF 1415 requests event monitoring from the NEF 1418, the NEF 1418 perform a monitoring event procedure. If an event occurs, it transfers a corresponding report to the PCF 1415.

During session generation/change, the SMF 1413 notifies the PCF 1415 of the current location of the terminal 1410. This can be determined in view of a user plane of the session used by the terminal 1410. That is, since the user plane is connected to the UPF 1414 through the base station 1411, it is possible to grasp base station unit information.

As another embodiment, a method by the NEF 1418 for acquiring UE location (as requested accuracy) is as follows.

The NEF 1418 requests event monitoring for the location of the terminal 1410 from the AMF 1412, and transfers accuracy information received from the AF 1416 together. The AMF 1412 determines the location of the terminal 1410 in accordance with a registration update message sent by the terminal 1410 or a service request based on the event monitoring request and corresponding accuracy (whether the level is a cell level, base station level, or TAI level), and transfers a report to the NEF 1418.

The NEF 1418 requests event monitoring for the location of the terminal 1410 from the SMF 1413. During the session generation/change, the SMF 1413 notifies the NEF 1418 of the current location of the terminal 1410. This can be determined in view of a user plane of the session used by the terminal 1410. That is, since the user plane is connected to the UPF 1414 through the base station 1411, it is possible to determine base station unit information.

Figure 16:
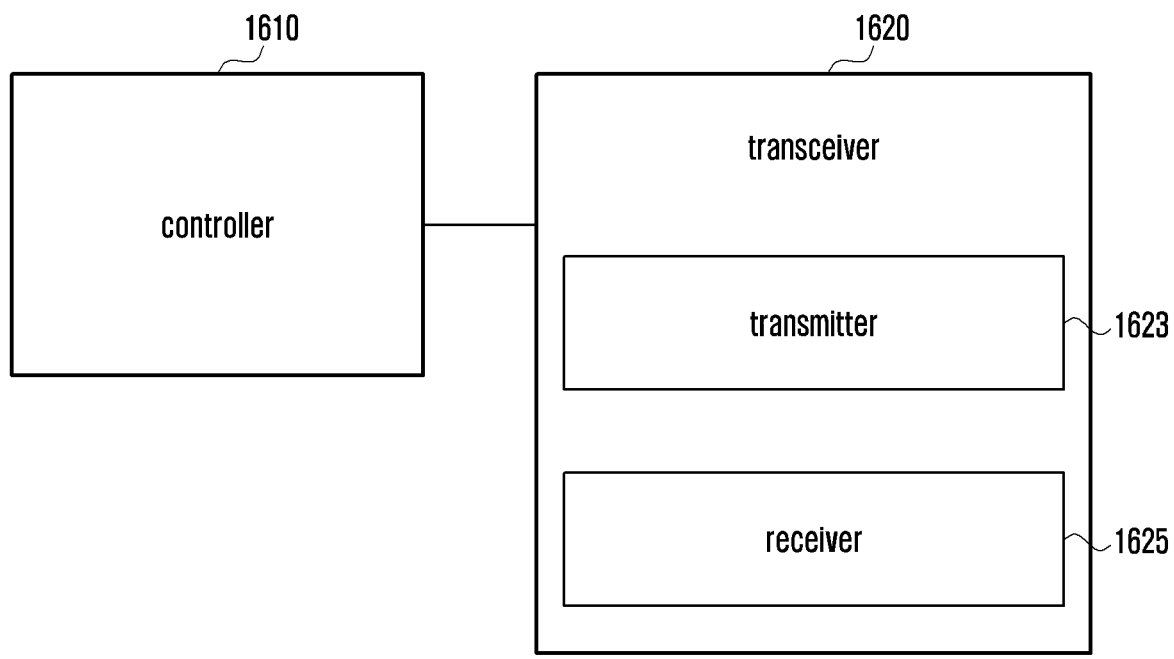
FIG. 16 illustrates a terminal according to an embodiment.

FIG. 16 is a diagram illustrating the configuration of a terminal according to the present disclosure.

In an embodiment of the present disclosure, a terminal may include a transceiver 1620 and a controller 1610 configured to control the overall operation of the terminal. Further, the transceiver 1620 may include a transmitter 1623 and a receiver 1625.

The transceiver 1620 may transmit/receive signals with other network entities.

The controller 1610 may control the terminal to perform any one of operations according to the above-described embodiments.

On the other hand, the controller 1610 and the transceiver 1620 may not be implemented by separate modules, but may be implemented by one constituent unit in the form of a single chip. Further, the controller 1610 and the transceiver 1620 may be electrically connected to each other. For example, the controller 1610 may include a circuit, an application-specific circuit, and/or at least one processor. Further, operations of the terminal may be implemented by providing a memory device storing corresponding program codes therein on a certain constituent unit in the terminal.

Figure 17:
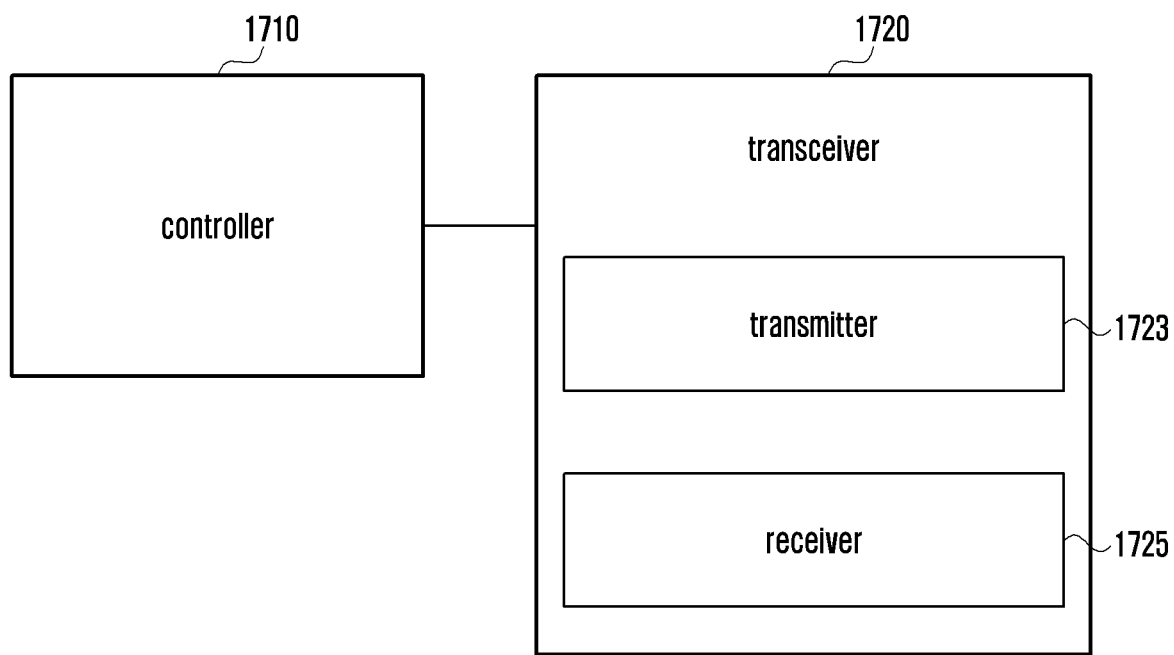
FIG. 17 illustrates a base station according to an embodiment.

FIG. 17 is a diagram illustrating the configuration of the base station according to the present disclosure.

In an embodiment of the present disclosure, a base station may include a transceiver 1720 and a controller 1710 configured to control the overall operation of the base station. Further, the transceiver 1720 may include a transmitter 1723 and a receiver 1725.

The transceiver 1720 may transmit/receive signals with other network entities.

The controller 1710 may control the base station to perform any one of operations according to the above-described embodiments.

On the other hand, the controller 1710 and the transceiver 1720 may not be implemented by separate modules, but may be implemented by one constituent unit in the form of a single chip. Further, the controller 1710 and the transceiver 1720 may be electrically connected to each other. For example, the controller 1710 may include a circuit, an application-specific circuit, and/or at least one processor. Further, operations of the base station may be implemented by providing a memory device storing corresponding program codes therein on a certain constituent unit in the base station.

Although not illustrated, a network entity, such as an AMF, an SMF, a UPF, an N3IWF, a home subscriber server (HSS), an NEF, a PCF, an AF, etc., according to an embodiment of the present disclosure may include a controller configured to control the overall operation of the network entity. Further, the transceiver may include a transmitter and a receiver, and may transmit and receive signals with other network entities. The controller may control the network entity to perform any one of operations according to the above-described embodiments. The controller may be electrically connected to the transceiver.

According to the present disclosure, a 5G core network configures a function in which an AS providing a service to the terminal requests a specific condition of the terminal in a bundle from the core network, and the core network automates and processes the request from the terminal in accordance with the location and the state of the terminal. Unlike when the core network notifies the AS of the terminal state every time, and accordingly receives and processes the request from the AS every time, according to an embodiment of the present disclosure, once the core network configures a specific event for a specific terminal and a corresponding operation and rule, the core network can perform the corresponding operation as soon as it determines the terminal state, and thus, can provide the service without separately depending on the request from the AS. Accordingly, signaling between the AS and the core network can be reduced, and time required for providing the corresponding service to the terminal can be shortened.

Although detailed embodiments of the present disclosure have been described in the specification and drawings, various modifications are possible within the scope of the present disclosure. Accordingly, the scope of the present disclosure should not be limited to the embodiments as described above, but should be defined by the appended claims below and their equivalents.

What is claimed is:

1. A method performed by a policy control function (PCF) entity in a communication system, the method comprising:
    receiving, from an application function (AF) entity, a first message including information on a data network access identifier (DNAI) and information on a spatial condition associated with a location of a terminal;
    transmitting, to a session management function (SMF) entity, a second message for receiving information associated with the location of the terminal based on the spatial condition;
    receiving, from the SMF entity, a third message including the information associated with the location of the terminal; and
    transmitting, to the SMF entity, a fourth message based on the information associated with the location of the terminal, the fourth message including the information on the DNAI,
    wherein the information on the DNAI is used for selecting a user plane function (UPF) entity toward which traffic routing is applied.

2. The method of claim 1, wherein the information associated with the location of the terminal is related to an area of interest and the area of interest is determined based on the spatial condition.

3. The method of claim 1, further comprising:
    transmitting, to the AF entity, a fifth message, as a response to the first message; and
    storing the information on the DNAI and the information on the spatial condition associated with the location of the terminal.

4. The method of claim 1, wherein the first message further comprises at least one of an identification of the terminal, a data network name, network slice information, or an application identifier.

5. A method performed by a session management function (SMF) entity in a communication system, the method comprising: receiving, from a policy control function (PCF)

entity, a first message for transmitting information associated with the location of a terminal: determining whether a location of a terminal is changed; transmitting, to the PCF entity, a second message including the information associated with the location of the terminal, as a response to a determination that the location of the terminal is changed; and receiving, from the PCF entity, a third message including information on a data network access identifier (DNAI), wherein the information on the DNAI is used for selecting a user plane function (UPF) entity toward which traffic routing is applied.

6. The method of claim 5, wherein the information associated with the location of the terminal is related to an area of interest and the area of interest is determined based on a spatial condition associated with the location of the terminal.

7. The method of claim 5, further comprising selecting the UPF entity based on the information on the DNAI.

8. The method of claim 5, wherein the first message comprises information on a spatial condition associated with the location of the terminal.

9. A policy control function (PCF) entity in a communication system, the PCF entity comprising: a transceiver; and a controller configured to; receive, from an application function (AF) entity via the transceiver, a first message including information on a data network access identifier (DNAI) and information on a spatial condition associated with a location of a terminal, transmit, to a session management function (SMF) entity via the transceiver, a second message for receiving information associated with the location of the terminal based on the spatial condition, receive, from the SMF entity via the transceiver, a third message including the information associated with the location of the terminal, and transmit, to the SMF entity via the transceiver, a fourth message based on the information associated with the location of the terminal, the fourth message including the information on the DNAI, wherein the information on the DNAI is used for selecting a user plane function (UPF) entity toward which traffic routing is applied.

10. The PCF entity of claim 9, wherein the information associated with the location of the terminal is related to an area of interest and the area of interest is determined based on the spatial condition.

11. The PCF entity of claim 9, wherein the controller is further configured to:
 transmit, to the AF entity via the transceiver, a fifth message, as a response to the first message, and
 store the information on the DNAI and the information on the spatial condition associated with the location of the terminal.

12. The PCF entity of claim 9, wherein the first message further comprises at least one of an identification of the terminal, a data network name, network slice information, or an application identifier.

13. A session management function (SMF) entity in a communication system, the SMF entity comprising: a transceiver; and a controller configured to: receive, from a policy control function (PCF) entity via the transceiver, a first message for transmitting information associated with the location of a terminal, determine whether a location of a terminal is changed, transmit, to the PCF entity via the transceiver, a second message including the information associated with the location of the terminal, as a response to a determination that the location of the terminal is changed, and receive, from the PCF entity via the transceiver, a third message including information on a data network access identifier (DNAI), wherein the information on the DNA is used for selecting a user plane function (UPF) entity toward which traffic routing is applied.

14. The SMF entity of claim 13, wherein the information associated with the location of the terminal is related to an area of interest and the area of interest is determined based on a spatial condition associated with the location of the terminal.

15. The SMF entity of claim 13, wherein the controller is further configured to select the UPF entity based on the information on the DNAI.

16. The SMF entity of claim 13, wherein the first message comprises information on a spatial condition associated with the location of the terminal.

17. The method of claim 2, wherein the information associated with the location of the terminal includes information indicating that the terminal entered the area of interest or the terminal left the area of interest.

18. The method of claim 6, wherein the information associated with the location of the terminal includes information indicating that the terminal entered the area of interest or the terminal left the area of interest.

19. The PCF entity of claim 10, wherein the information associated with the location of the terminal includes information indicating that the terminal entered the area of interest or the terminal left the area of interest.

20. The SMF entity of claim 14, wherein the information associated with the location of the terminal includes information indicating that the terminal entered the area of interest or the terminal left the area of interest.

* * * * *